US006990559B2

(12) United States Patent
Van Doren et al.

(10) Patent No.: US 6,990,559 B2
(45) Date of Patent: Jan. 24, 2006

(54) MECHANISM FOR RESOLVING AMBIGUOUS INVALIDATES IN A COMPUTER SYSTEM

(75) Inventors: Stephen R. Van Doren, Northborough, MA (US); Gregory E. Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 465 days.

(21) Appl. No.: 10/263,835

(22) Filed: Oct. 3, 2002

(65) Prior Publication Data

US 2004/0068622 A1 Apr. 8, 2004

(51) Int. Cl.
*G06F 12/08* (2006.01)

(52) U.S. Cl. ...................... 711/141; 711/121
(58) Field of Classification Search ................ 711/120, 711/121, 124, 141, 143, 144, 145, 146
See application file for complete search history.

(56) References Cited

U.S. PATENT DOCUMENTS

| 4,847,804 | A |   | 7/1989  | Shaffer et al.        |
|-----------|---|---|---------|-----------------------|
| 5,222,224 | A |   | 6/1993  | Flynn et al.          |
| 5,233,616 | A |   | 8/1993  | Callander             |
| 5,297,269 | A |   | 3/1994  | Donaldson et al.      |
| 5,303,362 | A |   | 4/1994  | Butts, Jr. et al.     |
| 5,313,609 | A |   | 5/1994  | Baylor et al.         |
| 5,490,261 | A |   | 2/1996  | Bean et al.           |
| 5,530,933 | A |   | 6/1996  | Frink et al.          |
| 5,537,575 | A |   | 7/1996  | Foley et al.          |
| 5,551,005 | A |   | 8/1996  | Sarangdhar et al.     |
| 5,579,504 | A | * | 11/1996 | Callander et al. ........... 711/144 |
| 5,608,893 | A |   | 3/1997  | Slingwine et al.      |
| 5,737,757 | A |   | 4/1998  | Hassoun et al.        |
| 5,761,731 | A |   | 6/1998  | Van Doren et al.      |
| 5,905,998 | A |   | 5/1999  | Ebrahim et al.        |
| 6,014,690 | A |   | 1/2000  | Van Doren et al.      |
| 6,055,605 | A |   | 4/2000  | Sharma et al.         |
| 6,061,765 | A | * | 5/2000  | Van Doren et al. ......... 711/145 |
| 6,088,771 | A | * | 7/2000  | Steely et al. ................ 711/154 |
| 6,094,686 | A |   | 7/2000  | Sharma                |
| 6,101,420 | A |   | 8/2000  | Van Doren et al.      |
| 6,105,108 | A |   | 8/2000  | Steely, Jr. et al.    |
| 6,108,737 | A |   | 8/2000  | Sharma et al.         |
| 6,108,752 | A |   | 8/2000  | Van Doren et al.      |
| 6,125,429 | A |   | 9/2000  | Goodwin et al.        |
| 6,154,816 | A |   | 11/2000 | Steely et al.         |

(Continued)

FOREIGN PATENT DOCUMENTS

EP          0 817 074 A1    7/1998

OTHER PUBLICATIONS

Agarwal et al., "An Evaluation of Directory Schemes for Cache Coherence", IEEE, 1988, pp. 280-289.*

(Continued)

*Primary Examiner*—Gary Portka

(57) ABSTRACT

The invention provides a system and method for resolving ambiguous invalidate messages received by an entity of a computer system. An invalidate message is considered ambiguous when the receiving entity cannot tell whether it applies to a previously victimized memory block or to a memory block that the entity is waiting to receive. When an entity receives such an invalidate message, it stores the message in its miss address file (MAF). When the entity subsequently receives the memory block, the entity "replays" the Invalidate message from its MAF by invalidating the block from its cache and issuing an Acknowledgement (Ack) to the entity that triggered issuance of the Invalidate message command.

14 Claims, 17 Drawing Sheets

U.S. PATENT DOCUMENTS

| | | | |
|---|---|---|---|
| 6,202,126 | B1 | 3/2001 | Van Doren et al. |
| 6,249,520 | B1 | 6/2001 | Steely, Jr. et al. |
| 6,249,846 | B1 | 6/2001 | Van Doren et al. |
| 2002/0199070 | A1* | 12/2002 | Chaudhry et al. ............ 711/147 |

OTHER PUBLICATIONS

Gharachorloo, K., Lenoski, D., Laudon, J., Gibbons, P., Gupta, A. and Hennessey, J., Memory Consistency and Event Ordering in Scalable Shared-Memory Multiprocessors, (c) 1990 IEEE, pp. 15-26.

Jouppi, N., Improving Direct-Mapped Cache Performance by the Addition of a Small Fully-Associative Cache and Prefetch Buffers, (c) 1990 IEEE, pp. 364-373.

Agarwal, A., Simoni, R., Hennesy, J. and Horowitz, M., An Evaluation of Directory Schemes for Cache Coherence, (c)1988 IEEE, pp. 353-362.

Papapanaroos, M. and Patel, J., A Low-Overhead Coherence Solution for Multiprocessors with Private Cache Memories, (c) 1984 IEEE, pp. 284-290.

UltraSPARC Ultra Port Architecture (UPA): The New-Media System Architecture, http://www.sun.com/processors/whitepapers/wp95-023.html, Copyright 1994-2002 Sun Microsystems, pp. 1-4.

Porting OpenVMS Applications to Intel Itanium Architecture, Compaq Conputer Corporation, Apr. 2002, pp. 1-17.

Adve, S., Hill, M., Miller, B. and Nester, R., Detecting Data Races on Weak Memory Systems,(c) 1991 ACM, pp. 234-243.

Gharachorloo, K., Sharama, M., Steely, S. and Van Doren, S., Architecture and Design of AlphaServer GS320, Nov. 2000, pp. 1-12.

IEEE Standard for Scalable Coherent Interface (SCI), (c) 1993 IEEE, pp. Table of Contents, 30-34 and 141-188.

Scales, D. and Gharachorloo, K., Design and Performance of the Shasta Distributed Shared Memory Protocol, XP-000755264, Jul. 7, 1997, pp. 245-252.

Scales, D., Gharachorloo, K. and Thekkath, C., Shasta: A Low Overhead, Software-Only Approach for Supporting Fine-Grain Shared Memory, XP-002173083, Jan. 10, 1996, pp. 174-185.

Scales, D. and Gharachorloo, K., Towards Transparent and Efficient Software Distributed Shared Memory, XP-000771029, Dec. 1997, pp. 157-169.

Scales, D., Gharachoroloo, K. and Aggarwal, A., Fine-Grain Software Distributed Shared Memory on SMP Clusters, WRL Research Report 97/3, Feb. 1997, pp. i and 1-28.

* cited by examiner

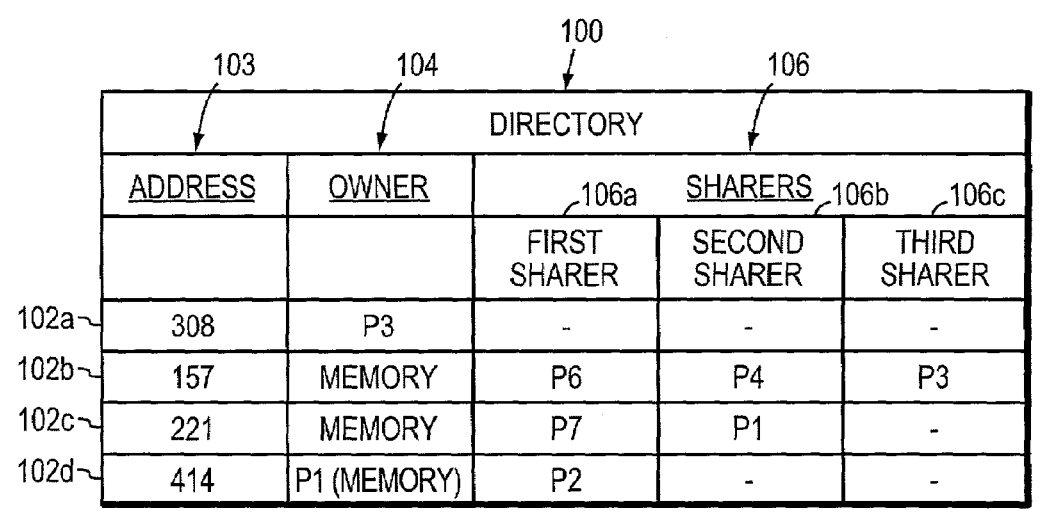

| | | DIRECTORY | | |
|---|---|---|---|---|
| ADDRESS | OWNER | FIRST SHARER | SECOND SHARER | THIRD SHARER |
| 308 | P3 | - | - | - |
| 157 | MEMORY | P6 | P4 | P3 |
| 221 | MEMORY | P7 | P1 | - |
| 414 | P1 (MEMORY) | P2 | - | - |

FIG. 1
(PRIOR ART)

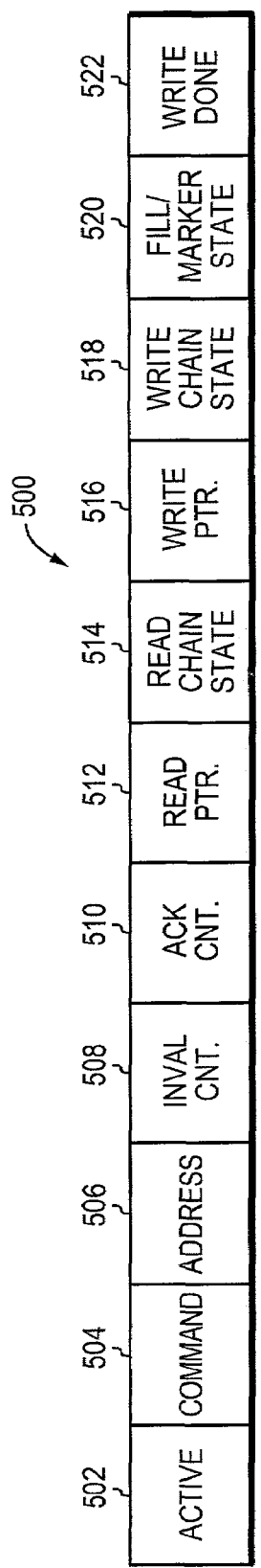
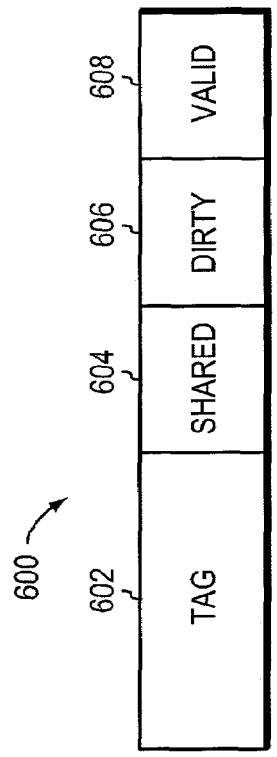
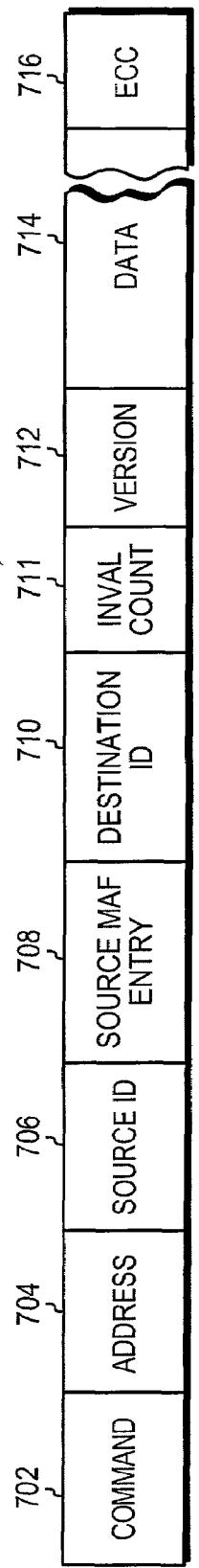
FIG. 5
FIG. 6
FIG. 7

| | MAIN DIRECTORY REGION 802 | | | | WRITE-BACK DIRECTORY REGION 804 | | |
|---|---|---|---|---|---|---|---|
| | | SHARER LIST 816 | | | | | |
| | OWNER/ SHARER 814 | SHARER 0 816a | SHARER 1 816b (SHARER VECTOR) 816c | UNUSED 818 | ECC 820 | WRITER 822 | UNUSED 824 | ECC 826 |
| 806a | MEMORY | 0 | 0 | 0 | - | MEMORY | 0 | - |
| 806b | MEMORY | P0 | 0 | 0 | - | MEMORY | 0 | - |
| 806c | P0 | 0 | 0 | 0 | - | MEMORY | 0 | - |
| 806d | P0 | P1 | 0 | 0 | - | MEMORY | 0 | - |
| 806e | P2 | 0 | 0 | 0 | - | MEMORY | 0 | - |
| 806f | P2 | P3 | 0 | 0 | - | P2 | 0 | - |
| 806g | P2 | 0 | 0 | 0 | - | P2 | 0 | - |
| 806h | P2 | P12 | 0 | 0 | - | 0 | 0 | - |
| 807 | P9 | 0100011100000000 | 0 | - | MEMORY | 0 | - |
| 808 | P6 | 0110001100000000 | 0 | - | MEMORY | 0 | - |
| 809 | P10 | 0 | 0 | 0 | - | P12 | 0 | - |
| 810 | P8 | 0000010000010010 | 0 | - | MEMORY | 0 | - |

FIG. 8

| | COMMAND 504 | ADDRESS 506 | INVAL COUNT 508 | ACK COUNT 510 | READ POINTER 512 | READ CHAIN STATE 514 | WRITE POINTER 516 | WRITE CHAIN STATE 518 | FILL STATE 520 | WRITE DONE 522 |
|---|---|---|---|---|---|---|---|---|---|---|
| ACTIVE 502 | | | | | | | | | | |
| YES | READ | - | 0 | 0 | 0 | INVALID | 0 | 0 | ACTIVE | NO |
| YES | READ | - | 0 | 0 | 0 | INVALID | P1 | INVAL PENDING | ACTIVE | NO |
| NO | READ | - | 0 | 0 | 0 | INVALID | P1 | INVALID | IDLE | YES |

1202a, 1202b, 1202c ← table 1202

FIG. 12

MECHANISM FOR RESOLVING AMBIGUOUS INVALIDATES IN A COMPUTER SYSTEM

CROSS-REFERENCE TO RELATED APPLICATION

This application is related to the following co-pending, commonly owned U.S. patent applications:

U.S. patent application Ser. No. 10/263,739 entitled DIRECTORY STRUCTURE PERMITTING EFFICIENT WRITE-BACKS IN A SHARED MEMORY COMPUTER SYSTEM, filed Oct. 3, 2002; and U.S. patent application Ser. No. 10/263,738 entitled LINKED LIST EARLY RACE RESOLUTION MECHANISM, filed Oct. 3, 2002.

BACKGROUND OF THE INVENTION

1. Field of the Invention

This invention relates to computer systems and, more specifically, to shared memory architectures.

2. Background Information

A computer system typically comprises one or more processors linked to a main memory by a bus or other interconnect. In most computer systems, main memory organizes the instructions and data being stored into units typically referred to as "blocks", each of which is separately addressable and may be of a fixed size. Instructions and data are typically moved about the computer system in terms of one or more blocks.

Ordinarily, a processor will retrieve data, e.g., one or more blocks, from main memory, perform some operation on it, and eventually return the results back to main memory. Retrieving data from main memory and providing it to a processor can take significant time especially in terms of the high operating speeds of processors. To reduce such latencies as well as to reduce the number of times a processor must access main memory, modern processors and/or processor chipsets include one or more cache memories or caches. A cache is a small, fast memory module that is placed in close proximity to the processor. Many caches are static random access memories (SRAMs), which are faster, but more expensive, than dynamic random access memories (DRAMs), which are often used for main memory. The cache is used to store information, e.g., data or instructions, which the processor is currently using or is likely to use in the near future. There are two basic types of caches: "write-through" caches and "write-back" caches.

With a write-through cache, whenever a processor modifies or updates a piece of data in the processor's cache, main memory's copy of that data is automatically updated. This is accomplished by having the processor write the data back to memory whenever the data is modified or updated. A write-back cache, in contrast, does not automatically send modified or updated data to main memory. Instead, the updated data remains in the cache until some more convenient time, e.g., when the processor is idle, at which point the modified data is written back to memory. The utilization of write-back caches typically improves system performance. In some systems, a write-back or victim buffer is provided in addition to the cache. "Victim data" refers to modified data that is being removed from the processor's cache in order to make room for new data received at the processor. Typically, the data selected for removal from the cache is data the processor is no longer using. The victim buffer stores this modified data which is waiting to be written back to main memory.

Symmetrical Multiprocessor (SMP) Systems

Multiprocessor computing systems, such as symmetrical multiprocessor (SMP) systems, provide a computer environment in which software applications may run on a plurality of processors using a single address space or shared memory abstraction. In a shared memory system, each processor can access any data item without a programmer having to worry about where the data is or how to obtain its value. This frees the programmer to focus on program development rather than on managing partitioned data sets and communicating values.

Cache Coherency

Because more than one processor of the SMP system may request a copy of the same memory block from main memory, cache coherency protocols have been developed to ensure that no processor relies on a memory block that has become stale, typically due to a modification or update performed to the block by some other processor. Many cache coherency protocols associate a state with each cache line. A given memory block, for example, may be in a shared state in which copies of the block may be present in the caches associated with multiple processors. When a memory block is in the shared state, a processor may read from, but not write to, the respective block. To support write operations, a memory block may be in an exclusive state. In this case, the block is owned by a single processor which may write to the cache line. When the processor updates or modifies the block, its copy becomes the most up-to-date version, while corresponding copies of the block at main memory and/or other processor caches become stale.

When a processor wishes to obtain exclusive ownership over a memory block that is currently in the shared state (i.e., copies of the block are present in the caches of other processors) invalidate requests are typically issued to those other processors. When an invalidate request is received by a given processor, its cache is searched for the specified memory block. If the block is found, it is transitioned to an invalid state. Many caches assign or associate a valid bit with each memory block or cache line stored in the cache. If the bit is asserted, then the cache line is considered to be valid and may be accessed and utilized by the processor. When a memory block is initially received from main memory, the valid bit is asserted and the memory block is stored in the cache. When an invalidate request is received, the valid bit of the respective cache line is de-asserted, thereby indicating that the cache line is no longer valid.

There are two classes of cache coherency protocols: snooping and directory based. With snooping, the caches monitor or snoop all transactions traversing the shared memory bus, looking for transactions that reference a memory block stored at the cache. If such a transaction is detected, the cache updates the status information for its copy of the memory block based on the snoop transaction. In this way, every cache that has a copy of a given memory block also has a copy of the status information of that block. With a directory based protocol, the state of each block is kept in a single, centralized location in the system, called a directory. Status information is not maintained in the individual caches.

FIG. 1 is a highly schematic illustration of a prior art directory 100. Directory 100 has a plurality of entries 102*a–d* each of which corresponds to a respective memory block. The directory 100 is organized, moreover, such that each entry 102*a–d* has a plurality of fields or cells for storing state and/or status information for the respective block. In particular, the directory 100 has an address column 103 that stores the address of the memory block, an owner column

104 that stores the identity of the entity, e.g., a processor or main memory itself, that is considered to be the owner of the memory block, and a sharer column 106 that stores the identity of those processors or other system entities that have a shared copy of the block.

The sharer column 106 may have a plurality of subcolumns 106*a–c*, each of which may contain the identity of a processor or a collection of processors that may have a shared copy of the respective memory block. If a request for shared access to a memory block is received from a first processor, P1, main memory examines the directory entry, e.g., entry 102*c*, for the block to determine its owner. As memory is itself the owner of the block, memory sends its copy of the block to P1 and enters P1's identifier (ID) into one of the sharer fields, e.g. field 106*b*, of the respective directory entry, e.g., entry 102*c*, thereby noting that P1 has a shared copy of the block. Since P1 only requested shared access to the memory block, the contents of the entry's owner field 104 are not modified.

If P1 issues a request for exclusive or write access to some other memory block, e.g., the block corresponding to entry 102*d*, main memory again examines the contents of entry 102*d*. Suppose that, at the time the request is received, the owner field reflected that memory was the owner of the memory block as shown in parentheses. In this case, memory sends the block to P1, and replaces the contents of the owner field 104 with P1's ID to reflect that P1, rather than memory, is now the owner of the memory block. P1 may then modify or update the memory block. If a request from a second processor, e.g., processor P2, is subsequently received for a shared copy of this memory block, main memory examines entry 102*d* of the directory 100 and determines that P1 is the owner of the memory block. Because its copy of the block, i.e., the copy stored at main memory, may be stale, memory does not forward its copy to P2. Instead, memory may be configured to forward the request to P1 and add P2's ID to one of the sharer fields, e.g., field 106*a*. In response to the forwarded request, P1 may then supply P2 with a copy of the modified memory block from P1's cache. Alternatively, main memory may be configured to force P1 to relinquish ownership of the memory block and return the modified version to memory so that memory can send a copy of the up-to-date version to P2.

In addition, many computer systems are designed to notify the directory when a "clean" memory block is being victimized from a cache to make room for a new block. A clean memory block is an unmodified block to which the processor had read, i.e., shared, access. Specifically, a processor may issue a Victim_Clean message to the directory notifying it that the processor is victimizing its clean copy of a block. Because the block is in the clean state, the processor does not have to return a copy of the clean block to the directory. Upon receipt of the Victim_Clean message, the directory updates its lists of sharers of the block by deleting the processor as one of the block's sharers. The directory is thus kept up-to-date as to which processors still have shared copies of the block. If an entity subsequently requests exclusive or write access to the block, invalidate messages are only sent from the directory to those entities still listed as having a shared copy of the block. Invalidate messages are not to those processors that issued Victim_Clean messages for the block as these processors have been removed from the directory's list of sharers.

In a computer system that relies on Victim_Clean messages to remove a processor from a list of sharers, the amount of directory state that is provided must scale with the size of the system so that each potential sharer can be exactly identified in the directory. This is not typically done in large computer systems as the amount of directory storage required to list all possible sharers is overly burdensome. In large computer systems, the identity of shares is often abbreviated in the directory using a coarse vector, each bit of which corresponds to a group (as opposed to one) processor. A Victim_Clean message that sees a coarse vector in the sharer list is unable to update directory state, due to the fact that another processor assigned to the same bit targeted by the Victim_Clean message may also have a cached copy of the block. Clearing the bit could erroneously indicate that no processors represented by that bit have a shared copy when in fact one or more of the processors may have a shared copy. Thus, Victim_Clean messages cannot be used to keep a sharer list up-to-date in such directories.

Other computer systems have been designed such that processors do not issue Victim_Clean messages. That is, if a processor victimizes a clean block from its cache, the processor does not issue a Victim_Clean message to the directory. For example, some directories use a coarse vector to track those entities having a shared or read access copy of a memory block, rather than specifically identifying each such processor. Each bit of a coarse vector tracks a group of processors any one or more of which may have a shared copy of the respective block. Victim_Clean messages cannot be used in this case as the directory does not know whether the source of the Victim_Clean was the only processor of the group have a copy of the block. Although this approach reduces communication overhead, thereby improving bandwidth, it results in the state of the directory becoming stale. That is, in the absence of a Victim_Clean message and a method to correlate the Victim_Clean to a value in the sharer column, as necessary, the directory may continue to indicate that a processor has a shared copy of a block when, in fact, the processor has victimized the block from its cache. This can lead to confusion or ambiguity when an invalidate is sent to the processor at the same time that the processor is issuing another request for the same block. More specifically, to obtain another copy of the block that is previously victimized, the processor issues a Read request. If, however, some other entity requests exclusive access to the block, the directory will issue an invalidate to the processor as the directory continues to reflect that the first processor has a shared copy of the block in its cache. When the invalidate is received at the processor, it cannot tell whether the invalidate applies to the version of the block that the processor victimized or to the new version that the processor has requested.

To eliminate the confusion, these systems utilized markers and required that the communication channels between the processors and main memory be ordered. When the directory is accessed in response to some request by entity, e.g., for read or write access to a block, the directory issues a marker message to the entity thereby notifying it that the directory has been accessed. The directory may thereafter issue other messages depending on the state of the directory, such a Fill message, invalidates, etc. If a processor, that is requesting another copy of a block that it victimized from its cache, receives an invalidate before the marker message, the processor "knows" that the invalidate applies to the earlier version of the block that was previously stored in its cache. If the marker message is received before an invalidate, then the processor "knows" that the invalidate applies to the current version of the block that the processor is requesting. This is so because the marker and invalidate messages are delivered in the same order that they are sent. Accordingly, the use of marker messages and ordered channels allows the processors to determine to which version of a memory block a received invalidate applies.

SUMMARY OF THE INVENTION

Briefly, the invention relates to a system and method for resolving ambiguous invalidate messages received by an entity of a computer system, such as a shared memory, symmetrical multiprocessor (SMP) computer system. The SMP system may comprise one or more nodes each having a plurality of processors and a plurality of shared memory subsystems coupled together by an interconnect fabric. The memory subsystems are configured to store data in terms of memory blocks, and each processor preferably has a cache for storing copies of memory blocks being used by the processor. Each processor further includes a miss address file (MAF) that keeps track of outstanding requests for a memory block not currently stored in the processor's cache. Coupled to the MAF are one or more state machines so that the entries of the MAF can be transitioned among a plurality of states. The SMP system additionally includes a directory for ensuring that the memory blocks, any one of which may be concurrently stored at multiple processor caches, remain coherent. In the illustrative embodiment, the directory has a plurality of entries each of which is assigned to a respective memory block. Each entry has an owner field that indicates which entity, e.g., a processor or memory, is the owner of the block, a sharer list field that indicates which entities, e.g., other processors, have a copy of the block in their caches, and a writer field that indicates which entity last wrote the block back to memory. The directory cooperates in the execution of a cache coherency protocol that permits multiple references to the same memory block to be executing within the SMP system at substantially the same time.

In response to a request for read access to a block owned by a first processor, the directory issues a Forward_Read command to the first processor instructing it to satisfy the request out of its cache. The directory also adds an identifier (ID) assigned to the requesting processor to the list of sharers that the directory maintains for the block. In response to a request for write access to a block that is owned by a first processor and shared by one or more other processors, the directory issues a Forward_Read_Modify (FReadMod) command to the owner instructing it to both satisfy the request from its cache and invalidate its copy. The directory also issues Invalidate commands to the sharers. When a processor issues a request for read access to a block that the processor previously had in its cache but has since victimized, it issues a Read command and creates a MAF entry to track the outstanding Read command. If the processor subsequently receives an Invalidate command, it is unable to determine whether the Invalidate is meant to invalidate the version that was victimized or the new version that the processor is waiting to receive, as the SMP system does not employ markers or ordered channels. In accordance with the invention, the processor assumes that the Invalidate command is for the new version and stores the Invalidate command in the MAF. When the block is received at the processor, it is placed in the cache, and the Invalidate command stored in the MAF is replayed. In particular, the processor marks the cache line holding the block as invalid and issues an Invalidate_Acknowledgement (IAck) to the processor that triggered issuance of the Invalidate command. By placing the block in the cache upon its receipt, the processor can still make forward progress despite having to replay the Invalidate command mand and invalidate the block.

When a processor issues a request for write access to a block that the processor victimized from its cache, the processor issues a Read_Modify (ReadMod) command and creates a MAF entry to track the outstanding ReadMod command. If the processor subsequently receives an Invalidate command, it knows that the Invalidate command refers to the previous version as only a FReadMod command would apply to the new version. Accordingly, the entity responds to the Invalidate command by issuing an IAck to the processor that triggered the issuance of the Invalidate command. Here, the processor neither stores the Invalidate command in its MAF nor replays the Invalidate upon receipt of the block.

In an alternative embodiment, rather than waiting to receive a block before replaying a stored Invalidate command and issuing the IAck, the processor stores the Invalidate command, but issues the IAck immediately upon receipt of the Invalidate. When the block is subsequently received, the processor performs an atomic Fill_To_Invalid operation. The Fill_To_Invalid operation places the received block into the processor's cache and invalidates it all in a single, un-interruptible operation. The desired portion of the block may be placed in one of the processor's registers so that the processor can make forward progress. No portion of the block, can be read out of the cache, however, as the block has been invalidated.

In another embodiment, the directory employs two different types of Invalidate commands that are issued in response to a request for write access to a block that is owned by one processor and shared by one or more other processors. Specifically, the directory issues a vanilla or regular Invalidate command to the owner in addition to the FReadMod command, and Invalidate_If_Clean commands to the non-owner, sharer processors. If a former sharer processor that victimized its earlier copy requests write access, i.e., ownership, over a block, but nonetheless receives an Invalidate_If_Clean command as a result of some earlier request for write access, the processor recognizes the Invalidate_If_Clean command as applying to an earlier version of the block. Accordingly, the processor issues an IAck to the processor that triggered the issuance of the Invalidate_If_Clean command, but does not invalidate the block from its cache. If the former sharer processor receives an Invalidate command, it recognizes the Invalidate command as applying to the current version of the block, invalidates it and issues an IAck to the processor that triggered the issuance of the Invalidate command.

BRIEF DESCRIPTION OF THE DRAWINGS

The invention description below refers to the accompanying drawings, of which:

FIG. 1, previously discussed, is a highly schematic diagram of a conventional directory;

FIG. 5 is a highly schematic block diagram of a miss address file (MAF) entry;

FIG. 6 is a highly schematic block diagram of a cache tag entry;

FIG. 7 is a highly schematic block diagram of a command packet;

FIG. 8 is a highly schematic block diagram of the directory of the present invention;

FIG. 12 is a highly schematic illustration of a Miss Address File entry.

DETAILED DESCRIPTION OF AN
ILLUSTRATIVE EMBODIMENT

Figure 2:
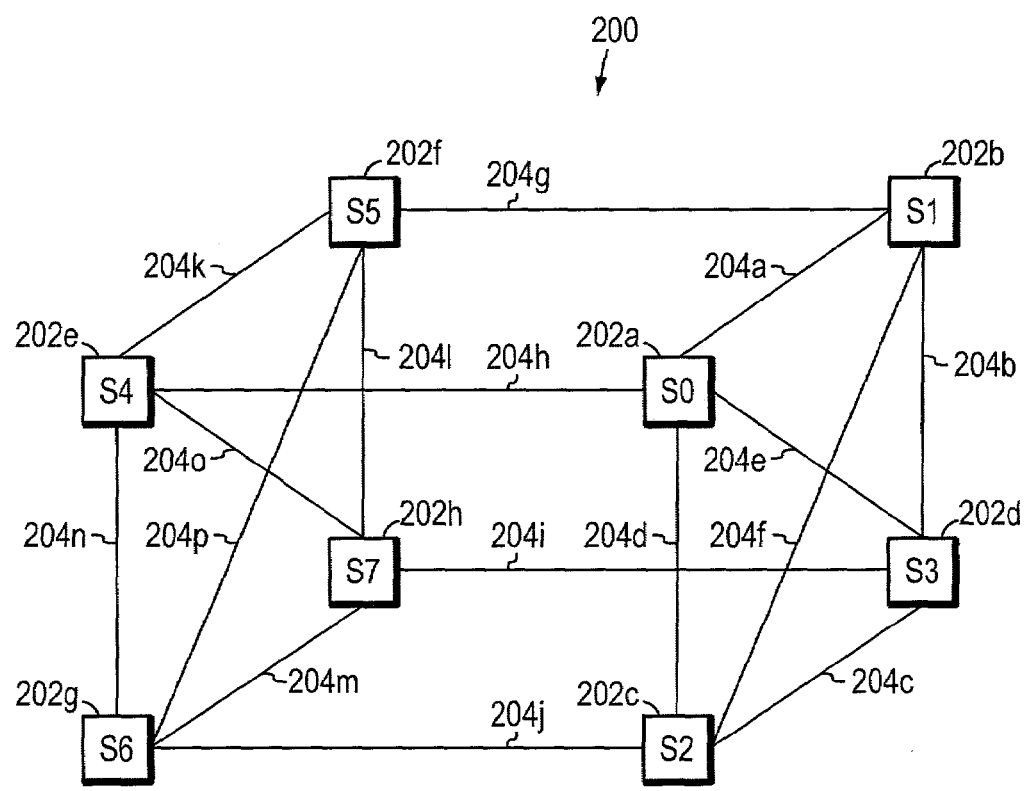
FIG. 2 is a highly schematic functional block diagram of a multi-processor node.

FIG. 2 is a highly schematic illustration of a preferred multiprocessor node 200 for use with the present invention. The node 200 comprises a plurality of, e.g., eight, sockets, S0–S7, which are designated by reference numerals 202a–h. The eight sockets 202a–h are logically located in three-dimensional space at the corners of a cube, and are interconnected by a plurality of inter-processor links 204a–p. Thus, each socket can communicate with any other socket of the node 200. In the illustrative embodiment, sockets forming two opposing sides of the node 200 are fully interconnected, while the two sides are connected only along the edges of the cube. That is, sockets S0–S3, which form one side of the cube, and S4–S7, which form the opposing side of the cube, are fully interconnected with each other, while the two opposing sides are connected by four inter-socket links 204g–j. As described herein, each socket includes one or more processors and has or is coupled to two main memory subsystems.

Figure 3:
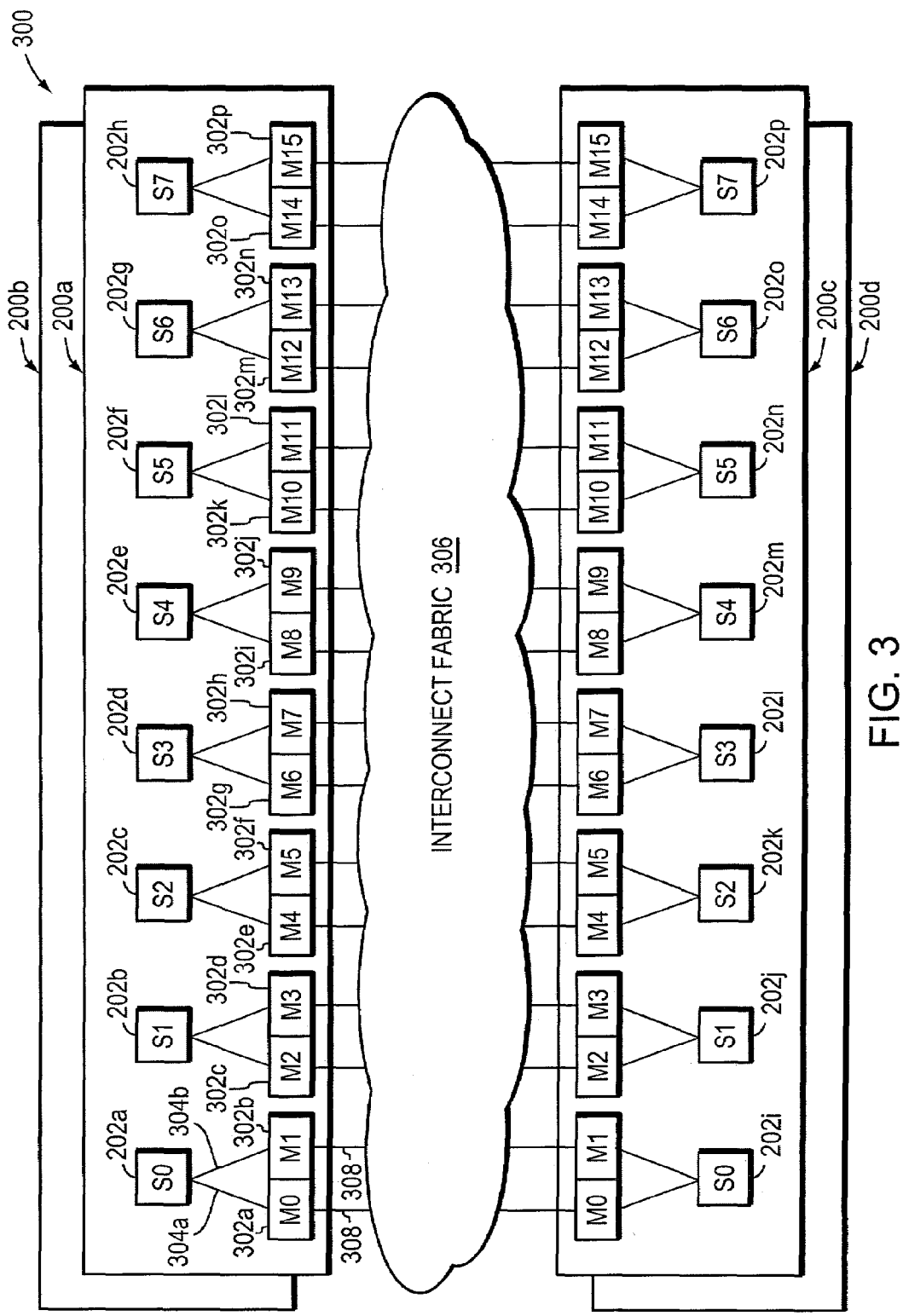
FIG. 3 is a highly schematic functional block diagram of a symmetrical multiprocessor (SMP) computer system formed from a plurality of multi-processor nodes.

FIG. 3 is a highly schematic illustration of a symmetrical multiprocessing (SMP) computer system 300 formed from a plurality of nodes. In particular system 300 comprises four nodes 200a–d, each of which is similar to node 200 (FIG. 2), although the inter-processor links have been omitted for clarity. As described above, each node, such as nodes 200a and 200c, has eight sockets, such as sockets 202a–h and 202i–p, respectively. Each node also includes a plurality of main memory subsystems. Preferably, each socket is coupled to a pair of memory subsystems, thereby providing sixteen memory subsystems at each node. At node 200a, the sixteen memory subsystems M0–M15 are designated by reference numerals 302a–p, and socket 202a is coupled to its pair of memory subsystems 302a and 302b by corresponding processor/memory links 304a and 304b.

The four nodes 200a–d, moreover, are fully interconnected with each other through an interconnect fabric 306. Specifically each memory subsystem, such as subsystems 302a and 302b, are connected to the interconnect fabric 306 by fabric links 308. In the preferred embodiment, each memory subsystem at a given node is coupled to its counterpart memory subsystem at the other three nodes. That is, memory subsystem M0 at node 200a is coupled by four fabric links to the M0 memory subsystem at the three other nodes 202b–d, memory subsystem M1 at node 200a is coupled by four fabric links to the M1 memory subsystem at the other three nodes 202b–d, and so on.

Figure 4:
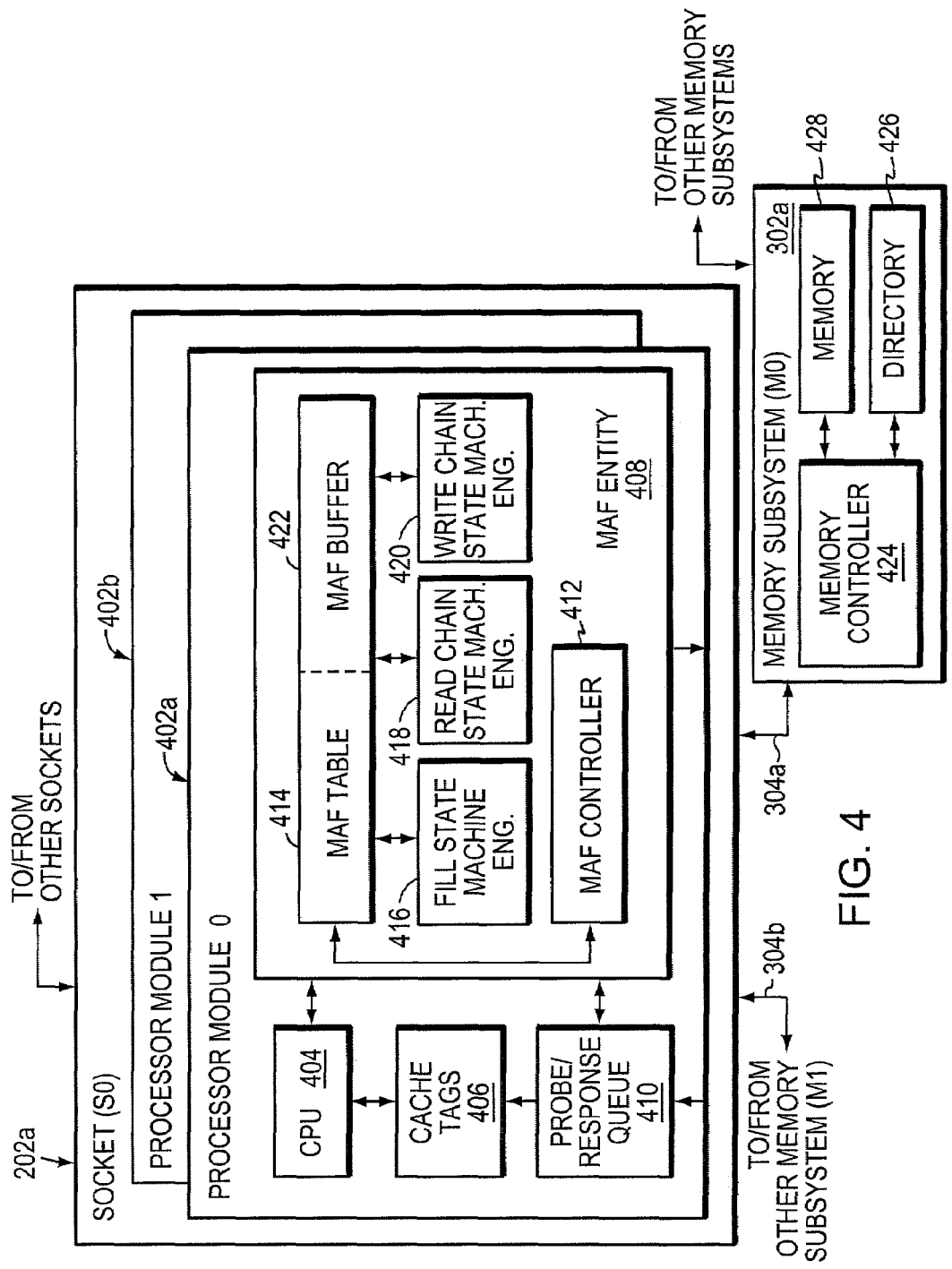
FIG. 4 is a highly schematic block diagram of a processor socket and memory subsystem of the SMP computer system of FIG. 3.
Figure 9:
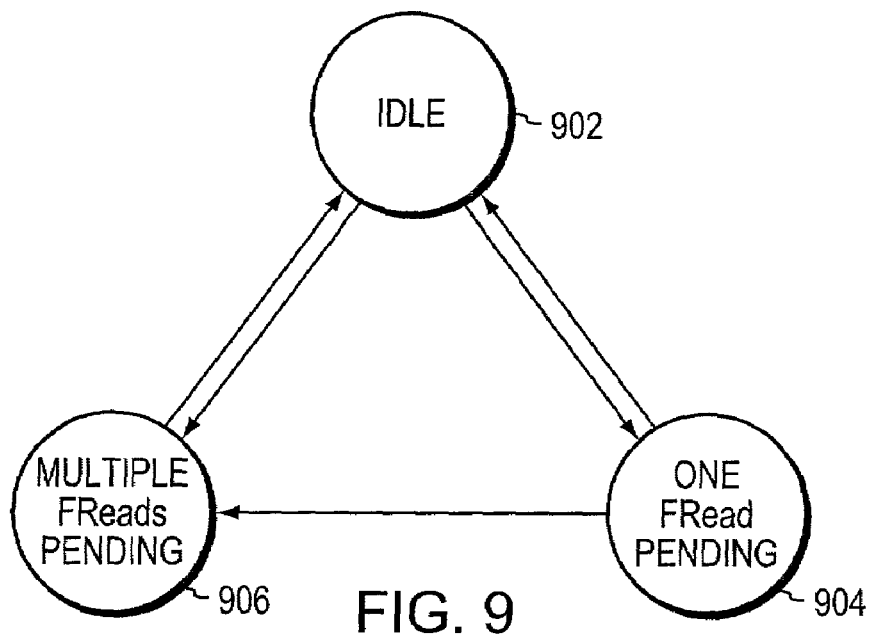
FIGS. 9 and 10 are state diagrams in accordance with the present invention.

FIG. 4 is a highly schematic illustration of socket (S0) 202a, and one of its associated memory subsystems (M0) 302a. Socket 202a includes two processor modules 402a and 402b. Each processor module, such as module 402a, has a processor or central processing unit (CPU) 404, a cache tags storage device 406, a miss address file (MAF) entity 408 and a probe/response queue 410. The CPU 404 includes one or more processor caches (not shown) at one or more levels that are in close proximity to the CPU for storing data that the CPU 404 is currently using or is likely to use in the near future. The caches are organized into cache lines, and each cache line can store a memory block. Information regarding the status of the memory blocks stored in the processor cache(s), such as the address and validity of the block, is maintained in the cache tags storage device 406. Device 406 may also store information regarding memory blocks stored at processor registers.

The MAF entity 408, which keeps track of outstanding commands, such as memory reference requests, issued to the system for memory blocks not presently in the cache, has a MAF controller 412, a MAF table 414 and one or more state machine engines. In the illustrative embodiment, the MAF entity 408 has a fill state machine engine 416, a read chain state machine engine 418 and a write chain state machine engine 420. A section or area of the MAF table 414, moreover, may be organized as a buffer, such as MAF buffer 422. The MAF buffer 422 may be used to temporarily store memory blocks received in response to the memory reference requests issued by the CPU 404, and awaiting loading into a processor cache entry or processor register.

Processor module 402b similarly includes a CPU, a cache tags storage device, a MAF entity and a probe/response queue. Socket (S0) 202a is coupled to the other sockets (S1–S7) of node 200a by inter-socket links and to memory subsystems (M0) 302a and (M1) 302b by processor/memory links 304a and 304b, respectively.

It should be understood that each processor module 402 may include other components, such as a write back or victim buffer, a register file, a translation look-aside buffer (TLB), load/store (L/S) queues, etc.

CPU 404 may be and/or include any one of the processors from the Itanium architecture from Intel Corp. of Santa Clara, Calif., such as the Itanium® 1 or Itanium® 2 processors. Nonetheless, those skilled in the art will understand that other processors, such as the Hammer series of 64-bit processors from Advanced Micro Devices, Inc. (AMD) of Sunnyvale, Calif., may also be used.

Preferably, commands received at the socket 202a and buffered in probe/response queue are first checked against MAF table 414 to determine whether the command collides with a pending MAF entry, i.e., whether the received command specifies the same memory block for which a pending MAF entry was created. If there is no collision with MAF table 414, the command is then tested against processor cache to see if there is hit or miss.

The memory subsystem (M0) 302a has a memory controller 424, a directory 426 and one or more memory modules or banks, such as memory unit 428. The memory subsystems of nodes 200a–d combine to form the main memory of the SMP system 300 some or all of which may be shared among the processors. Each socket 202, moreover, includes a portion of main memory by virtue of its respective memory subsystems 302. Data stored at the memories 422 of each subsystem 302, moreover, is organized into separately addressable memory blocks that, as mentioned above, are equivalent in size to the amount of data stored in a processor cache line. The memory blocks or cache lines are of uniform, fixed size, and represent the smallest unit of data that can be moved around the SMP system 300. In the preferred embodiment, each cache line contains 128-bytes of data, although other fixed sizes, such as 64-bytes, could be utilized. Each memory address, moreover, maps to and thus identifies one and only one memory block. And, a plurality of address bits, such as the upper three address bits, are preferably employed to identify the "home" memory subsystem of the respective memory block. That is, each memory block, which is separately addressable by the SMP system 300, has a pre-determined home memory subsystem that does not change. Each directory, moreover, maintains status information for the memory blocks for which its memory subsystem is the home memory. In other words, rather than having a single, centralized directory, the "directory" for the SMP system 300 is distributed across all of the memory subsystems.

Memory unit 428 may be and/or may include one or more conventional or commercially available memory structures, such as dynamic random access memory (DRAM), synchronous DRAM (SDRAM), double data rate SDRAM (DDR-SDRAM) or Rambus DRAM (RDRAM) memory devices, among others.

It should also be understood that each socket 202 may further include one or more input/output (I/O) subsystems (not shown), such as an I/O bridge, that connects one or more I/O devices or peripherals to the SMP system 300. The I/O subsystems, moreover, may have their own private caches for buffering data, and the I/O devices may be granted access to some or all of the SMP system's main memory through the I/O subsystems. The processors and I/O subsystems may be referred to as data processing entities as they are configured to issue requests for memory blocks.

The MAF table 414 is organized at least logically as a table or array having a plurality of rows and columns whose intersections define cells for storing information. FIG. 5 is a highly schematic block diagram of an exemplary row or entry 500 of MAF table 414 (FIG. 4). Entry 500 has a plurality of fields including a 1-bit active field or flag 502, which indicates whether the respective entry 500 is active or inactive, i.e., whether the outstanding request represented by entry 500 is complete or not. A request that is not yet complete is considered active. Entry 500 further includes a command field 504 that specifies the particular command that is outstanding, and an address field 506 that specifies the memory address corresponding to the command. Entry 500 additionally includes an invalid count (Inval Cnt.) field 508, an acknowledgement count (Ack Cnt.) field 510, a read pointer (ptr.) field 512, a read chain state field 514, a write pointer field 516, a write chain state field 518, a Fill state field 520 and a write done field 522.

Each state machine engine 416, 418 and 420 can transition a respective MAF entry 500 among a plurality of states. The Fill state machine engine 416 stores the current fill state of a MAF entry 500 in the Fill state field 520. The read chain state machine engine 418 stores the current read chain state in field 514, and the write chain state machine engine stores the current write chain state in field 518.

The cache tags storage device 406 (FIG. 4) is also organized at least logically as a table or array having a plurality of rows and columns whose intersections define cells for storing information. FIG. 6 is a highly schematic block diagram of an exemplary row or entry 600 of the cache tags storage device 406. As mentioned above, each entry of the cache tags storage device 406, including entry 600, corresponds to a particular cache line stored at the processor's cache(s). Cache tag entry 600 includes a tag field 602 that specifies the memory address of the respective cache line, and a series of status flags or fields, including a shared flag 604, a dirty flag 606 and a valid flag 608. The valid flag 608 or bit indicates whether the respective cache line has a copy of valid data in it, i.e., whether the data is coherent with the latest version of the block. The shared flag 606 or bit indicates whether more than one processor cache in the SMP system has a copy of the block. The dirty flag 608 or bit indicates whether the cache line has been modified or changed by the processor and is thus more up-to-date than the version stored at main memory. When a processor writes to a cache line, it sets the dirty flag 608 to indicate that this version of the block is now the latest version.

Virtual Channels

A CPU 404, I/O subsystem and memory subsystem 302 of the SMP system 300 may each be referred to generally as an "entity", and the entities of the SMP system 300 interact with each other by issuing "command packets", or simply "commands" to each other. Commands may be classified generally into three types: Requests, Probes and Responses. Requests are commands that are typically issued by a processor when, as a result of executing a load or store operation, it must obtain a copy of data. It should be understood that the term "data" as used herein is broadly defined to include instructions as well as data. Requests are also used to gain exclusive ownership or write access to a piece of data, e.g., a memory block. Requests include Read commands, Read_Modify (ReadMod) commands, Change_to_Dirty (CTD) commands, and Write_Back (WB) commands, among others. Probes are commands issued to one or more processors requesting data and/or cache tag status updates. Probe commands include Forwarded_Read (FRead) commands, Forwarded_Read_Modify (FReadMod) commands, and Invalidate (Inval) commands, among others. Responses are commands which carry requested data to a processor or acknowledge some request. For Read and ReadMod commands, the responses are Fill and Fill_Modify (FillMod) commands, respectively. For CTD commands, the responses are CTD_Success or CTD_Failure commands. For WB commands, the response may be a WB_Acknowledgement command.

FIG. 7 is a highly schematic, partial block diagram of a preferred form of a command packet 700. The command packet 700 is organized into a plurality of fields. Specifically, command packet 700 has a command field 702 which carries an operation code (opcode) indicating the type of command, e.g., Read, ReadMod, Fill, etc., the packet is. An address field 704 specifies the physical address of the memory block to which the command refers. A source identifier (ID) 706 specifies the entity that sourced or issued the command 700. A source MAF entry field 708 specifies the particular entry within the MAF table that has been established at the source entity for the command 700. A destination ID 710 specifies the intended recipient or target of the command 700. An Inval Count field 711 specifies the number of invalidate acknowledgements that are to be received. A version field 712, as described more fully below, can be used to specify a particular version of the memory block being requested. Command may further include a data field 714 for carrying a memory block, and an error correction code (ECC) field 716.

It should be understood that each processor of the system is preferably assigned a unique processor identifier (PID), and that each memory subsystem and I/O subsystem is also assigned a unique ID. For commands issued by a processor, the processor's PID is entered in the source ID field 706. For commands directed to a processor, the target processor's PID is entered in the destination ID field 708. For commands directed to memory, the destination ID field 708 is loaded with the ID assigned to the referenced memory block's home memory subsystem.

Memory reference operations, such as reads, are preferably executed by the SMP system 300 through a series of steps whereby each step involves the exchange of a particular command among the entities of the SMP system 300.

To avoid deadlock, the cache coherency protocol of the present invention utilizes a plurality of channels established within the SMP system 300. Preferably, the channels share physical resources and are thus "virtual" channels. Each virtual channel, moreover, is assigned a specific priority relative to the other virtual channels so that, by appropriately assigning the different command types to different virtual channels, the SMP system 300 can also eliminate flow dependence. In general, commands corresponding to later steps in a series are assigned to higher priority virtual channels than the commands corresponding to earlier steps.

In accordance with the present invention, the SMP system 300 maps commands into at least three (3) different virtual channels. A Q0 channel carries processor command packet requests for memory space read and write transactions. A Q1 channel accommodates probe command packets to Q0 requests. A Q2 channel carries response command packets to Q0 requests.

A suitable mechanism for implementing virtual channels in a large SMP system is described in U.S. Pat. No. 6,014,690, issued Jan. 11, 2000 for EMPLOYING MULTIPLE CHANNELS FOR DEADLOCK AVOIDANCE IN A CACHE COHERENCY PROTOCOL, which is hereby incorporated by reference in its entirety.

Those skilled in the art will recognize that other and/or additional virtual channels could be defined. The three virtual channels described above, moreover, can be configured to carry other types of command packets. The Q0 virtual channel, for example, may also accommodate processor command request packets for programmed input/output (PIO) read and write transactions, including control status register (CSR) transactions, to input/output (I/O) address space. Alternatively, a QIO virtual channel having a priority below the Q0 virtual channel can be defined to accommodate PIO read and write transactions.

In the illustrative embodiment, the processors and memory subsystems of the SMP 300 system cooperate to execute a write-invalidate, ownership-based cache coherency protocol. "Write-invalidate" implies that when a processor wishes to modify a cache line, it causes copies of the cache line that may be located in other processors' caches to be invalidated, rather than updating them with the new value. "Ownership-based" implies there is always an identifiable owner for a cache line, whether it is memory, an I/O subsystem or one of the processors of the SMP system 300. The owner of a cache line, moreover, is responsible for supplying the most up-to-date value upon request. A processor may own a cache line "exclusively" or "shared". If a processor has exclusive ownership over a cache line, it may modify or update the cache line without informing the system. Otherwise, it must inform the system and potentially invalidate copies located in other processors' caches.

Directory 426, like the MAF, is also organized at least logically as a table or array having a plurality of rows and columns whose intersections define cells for storing information. FIG. 8 is a highly schematic block diagram of directory 426. Directory 426 is preferably organized into two regions or areas, a main directory region 802 and a write-back directory region 804. A plurality of rows 806–710 span both regions 802 and 804 of the directory 426. Several versions of row 806, which are described below, are shown. Within each region 802 and 804, a plurality of columns are defined for specifying the type of information stored in the directory's entries. The main directory region 802, for example, has an owner/sharer column 814 for storing the identifier (ID) assigned to the entity that owns the cache line, and a sharer list column 816 for indicating which entities, if any, have a shared copy of the cache line.

The sharer list column 816 is preferably configured to operate in one of two different modes. In a first mode, sharer list column 816 is organized into two sharer columns 816*a* and 816*b* each of which can store the ID assigned to a single entity, such as a processor, of the SMP system 300 that has a shared copy of the respective cache line. If a third entity is to be added as a sharer, the sharer list column 816 converts from two sharer columns 816*a* and 816*b* to a single coarse sharer vector column 816*c*. Each bit of the sharer vector column 816*c* corresponds to and thus identifies a set of one or more sockets 202 of system 300. If a bit is asserted, then at least one processor located within the set of sockets associated with the asserted bit has a copy of the respective cache line. The set of sockets may or may not correspond to a node. Entries 807 and 809 illustrate the first mode, and entries 808 and 810 illustrate the second mode. Main region 802 further includes an unused column 818 and an error correction code (ECC) column 820 for storing an ECC value calculated for the data in fields 814–818.

The write-back region 804 has a writer column 822, an unused column 824 and an ECC column 826. As explained herein, the contents of the owner/sharer column 814 of the main region 802 together with the contents of the writer column 822 of the write-back region 804 determine who owns the respective cache line and thus where the most up-to-date version is located within the SMP system 300. The ECC column 826 stores an ECC value calculated for the data in fields 822 and 824.

The unused fields 818 and 824 are provided in order to support modifications to the protocol and/or increases in the size of the address or other fields. It should be understood that one or more bits of unused column 814 may be used to signify whether the corresponding entry's sharer list 816 is in individual sharer mode, i.e., fields 816*a* and 816*b*, or in coarse sharer vector mode, i.e., sharer vector field 816*c*.

In the preferred embodiment, directory 426 is actually located within the memory unit 428 itself along with the memory blocks, and is not a separate memory component. That is, each memory address indexes to an area of the memory device 422 that is preferably divided into three regions. The first region corresponds to the main directory region, the second region corresponds to the write-back region, and the third region corresponds to the data contents of the memory block.

In the illustrative embodiment, the owner/sharer field 814 is 10-bits, the sharer list field 816 is 16-bits, thereby supporting either two 8-bit sharer IDs or one 16-bit coarse sharer vector, and the unused and ECC fields 818, 820 are each 7-bits. The main directory region 802 of a memory area is thus 5-bytes. For the write-back region 804, the writer field is 9-bits, the unused field 824 is 1-bit and the ECC field 826 is 6-bits, thereby making the write-back region 2-bytes. The third region includes the cache line, which may be 128-bytes, and a 9-byte ECC field (not shown) calculated for the memory block for a total of 137-bytes. Accordingly, for each memory block, the memory area comprises 144-bytes of information in total.

As mentioned above, each CPU 404 of the SMP system 300 may access portions of memory stored at the two memory subsystems 302 coupled to its socket, i.e., a "local" memory access, or at the memory subsystems coupled to any other socket of the SMP system 300, i.e., a "remote"

memory access. Because the latency of a local memory access will differ from the latency of a remote memory access, the SMP system 500 is said to have a non-uniform memory access (NUMA) architecture. Further, since the system 300 provides coherent caches, the system is known as a cache-coherent NUMA (CC-NUMA) system.

Operation of the Distributed Directory

Each memory subsystem 302 preferably includes a built-in, self test (BIST) engine (not shown) that is used during initialization of the subsystem. The BIST engine initializes the contents of the memory device 422, including the directory contents and ECC values, by setting them to predetermined values as one of the final steps of the self test. It should be understood that firmware, rather than or in addition to a BIST engine, may be used for initialization purposes.

As data is brought into the SMP system 300, it is loaded into the memory devices 422 of the memory subsystems 302 in units of memory blocks. As each memory block is stored at a memory subsystem 302, the memory controller 424 computes a first error correction code (ECC) value for the block which is stored along with the cache line as described above. Data may be brought into the memory subsystems 302 from any number of sources, such as floppy disk drives, hard disk drives, tape drives, optical or magneto-optical drives, scanners, sound cards, etc. The memory controller 424 also loads the owner/sharer field 814 in the main region 802 and the writer field 822 in the write-back region 804 with the same value, preferably the ID assigned to the memory subsystem. The remaining fields of each entry are preferably de-asserted and/or set to null, e.g., to zero. The memory controller 424 also computes a second ECC value for the information in the main directory region 802, and a third ECC value for the information in the write-back region 804. The second ECC value is stored in ECC field 820 while the third ECC value is stored in ECC field 826. Entry 806a illustrates how a directory entry would appear upon initialization of the memory subsystem.

Read Command

Suppose a processor, e.g., processor P0, of the SMP system 300 wishes to read a memory block that is not present in its cache. Processor P0 preferably issues a Read command on the Q0 virtual channel specifying the address of the desired memory block. Processor P0 also directs MAF entity 416 to create an entry in the MAF table 414 for this request. MAF entity 416 asserts the active flag 502, loads the command field 504 with the opcode associated with a Read command and enters the block's address in the address field 506. MAF engine 412 transitions the state associated with the entry and reflected in MAF state field 520 from the idle state to the active state. The remaining fields of the MAF entry 500 may be de-asserted. The SMP system 300 routes the Read command from processor P0 to the home memory subsystem for the specified memory block, e.g., subsystem 302a.

At the home memory subsystem 302a, the memory controller 424 accesses the area of memory device 422 specified by the address contained in the Read command, and retrieves the directory entry, e.g., entry 806a, for the block. The memory controller 424 first examines the information stored in the owner/sharer field 814 and the writer field 822 of the identified entry 806a. Because the contents of both the owner/sharer field 814 and the writer field 822 are the same, i.e., memory, the memory controller 424 concludes that it is the owner of the cache line, and that the version stored at its memory device 422 is the most up-to-date version. Accordingly, the memory controller 424 responds to the Read command by sending processor P0 a copy of the block from memory device 422.

Specifically, the memory controller 424 issues a Fill command on the Q2 virtual channel that includes the address and data of the requested block. The memory controller 424 also adds P0's PID to the list of sharers maintained in the sharer column 816. Assuming P0 is the first entity to request a shared copy of the cache line, memory controller 424 enters P0's PID into sharer field 816a. As P0 has only requested a shared copy of the cache line, the memory controller 424 does not modify the contents of the owner/sharer field 812. The memory controller 424 also does not modify the contents of the writer field 822. Entry 806b (FIG. 8) illustrates how entry 806a would appear following the updates performed by the memory controller 424 in response to the Read command from P0.

It should be understood that, when a memory block is read out of a memory device 422, the memory controller 424 preferably checks parity information, e.g., a parity bit, to determine whether the retrieved data has been corrupted. If so, the memory controller 424 utilizes the previously computed ECC value to recover the data. The recovered data is then sent to the requesting entity. The recovered data may also be loaded back into the memory device 422, overwriting the corrupted data. Controller 424 also checks a parity bit when reading information from the main directory region 802. And, if the information in the main directory region 802 is updated, such as by adding P0 to the sharer list 816, the memory controller 424 computes a new ECC value and stores it in ECC field 820.

In some SMP systems that use ordered Q1 commands, a fill marker mechanism is employed to inform a processor that its request, such as a Read command, has accessed the home memory's directory, and that the requested data is in the process of being returned to the processor. Typically, the fill marker mechanism is implemented through the issuance of a separate Marker command by the memory subsystem to the processor upon access to the directory. In the illustrative embodiment, memory controller 424 does not send a separate Marker command message in response to Read commands. Nonetheless, those skilled in the art will recognize that a fill maker mechanism could be implemented by SMP system 300.

At processor P0, the Fill command is received at the probe/response queue 410, and the MAF engine 412 retrieves the entry from MAF table 414 corresponding to the received Fill command. The MAF engine 412 transitions the state reflected in the MAF state field 520 from the active state to the idle state, and the matching entry is rendered inactive by de-asserting the active flag 502. The data included with the Fill command is loaded into P0's cache and the respective entry 600 of the cache tags storage device 406 is up-dated. Specifically, the tag field 602 is loaded with the address of the received block, the shared and valid flags 604 and 608 are asserted and the dirty flag 606 is de-asserted.

ReadMod Command

Suppose that, instead of wanting just read access to a cache line, processor P0 wishes to obtain write access over a cache line that is not present in its cache.

In this case, processor P0 preferably issues a Read_Modify (ReadMod) command on the Q0 virtual channel specifying the address of the desired cache line. Processor P0 also directs MAF entity 416 to establish an entry in the MAF table 414 for the outstanding ReadMod command. MAF entity 416 asserts the active flag 502, loads the command field 504 with the opcode associated with a ReadMod command, and enters the address of the block in the address field 506. In addition, MAF entity 416 transitions the state as reflected in MAF state field 520 from the idle state to the active state. The remaining fields of the MAF table entry 500 may be de-asserted. System 300 routes the ReadMod command from processor P0 to the block's home memory subsystem 302*a*.

At memory subsystem 302*a*, the memory controller 424 accesses the area specified by the address of the ReadMod command, and retrieves the corresponding directory entry, i.e., entry 806*a*. The memory controller 424 first examines the information stored in the owner/sharer field 814 and the writer field 822 of the identified entry 806*a*. Because the contents of both the owner/sharer field 814 and the writer field 822 are the same, i.e., they both indicate memory, the memory controller 424 concludes that it is the owner of the block, and that the version stored at its memory 428 is the most up-to-date version. The memory controller 424 also checks the sharer column 812 to see whether any other entities have a shared copy of the requested cache line. In this case, no entities have a shared copy of the cache line. Accordingly, the memory controller 424 responds to the ReadMod command by sending processor P0 a copy of the block from its memory device 422.

Specifically, the memory controller 424 issues a Fill_Modify (FillMod) command on the Q2 virtual channel that includes the address and data of the requested block. Because P0 is requesting write access to the block, the memory controller 424 inserts P0's PID into the entry's owner/sharer field 814 replacing the current value, i.e., memory. Nonetheless, the memory controller 424 does not modify the contents of the entry's writer field 822. Entry 806*c* (FIG. 8) illustrates how entry 806*a* would appear following the updates performed by the memory controller 424 in response to the ReadMod command from P0.

If, at the time the ReadMod command is received at the memory controller 424, the sharer column 812 of entry 806*a* indicated that one or more entities have a shared copy of the block, the memory controller 424 would issue an Invalidate (Inval) command on the Q1 virtual channel to each such entity directing them to invalidate their copies of the block. Supposing there were two such entities, the memory controller 424 would also have set an invalid count within the FillMod command to two. When the FillMod command is received at P0, the corresponding MAF entry is located and the Inval Count field 508 is set to two as specified by the FillMod command.

In response to the Inval commands from the memory controller 424, the other entities invalidate their copies of the cache line and send Invalidate_Acknowledgement (IAck) commands on the Q2 virtual channel to P0. In response to each IAck command, P0 increments the Ack Count field 510 of the respective MAF entry 500 by one. The MAF engine 412 continuously checks the values of the Inval Count and Ack Count fields 508 and 510. When the two values are the same, indicating that each and every entity that had a shared copy of the cache line has invalidated its copy, P0 considers the block to be consistent and available to it for processing.

Suppose, after granting P0 write access over the block, another processor, e.g., processor P1, issues a Read command for the block. The Read command is routed by the SMP system 300 to memory subsystem 302*a* which is the block's home memory. The memory controller 424 locates the directory entry, i.e., entry 806*c*, corresponding to this cache line and examines the information stored in the owner/sharer field 814 and the writer field 822 of the identified entry 806*a*. As the owner/sharer field 814 indicates P0 and the writer field 822 indicates memory, the two values are not the same. In this case, the memory controller 424 concludes that the entity specified in the, owner/sharer field 814, i.e., P0, rather than the memory subsystem itself, is the owner and has the most up-to-date version of the block. Accordingly, the memory controller 424, issues a Forwarded_Read (FRead) command on the Q1 virtual channel to P0. The memory controller 424 updates the sharer list column 816 for this directory entry to reflect that processor P1 has a shared copy of the block. The memory controller 424 does not, however, modify either the owner/sharer field 814 or the writer field 822. Entry 806*d* (FIG. 8) illustrates how entry 806*c* would appear following the updates performed by the memory controller 424 in response to the Read from P1.

P0 responds to the FRead by sending a copy of the block from its cache to P1 on the Q2 virtual channel.

ReadMod Command with other Processor as Owner

Suppose a third processor, P2, now issues a ReadMod command for this same memory block. The ReadMod is routed by the SMP system 300 from processor P2 to memory subsystem 302*a* which is the block's home memory. The memory controller 424 accesses the area of memory device 422, and retrieves the directory entry, i.e., entry 806*d*, corresponding to the block. Controller 424 then examines the information stored in the entry's owner/sharer field 814 and writer field 822. As the two values are not the same, the memory controller 424 concludes that P0, rather than the memory subsystem itself, is the owner and thus has the most up-to-date version of the block. Memory controller 424 also examines the sharer list column 816 and determines that P1 has a shared copy of the block. In this case, the memory controller 424 issues a Forwarded_Read_Modify (FReadMod) command on the Q1 channel to P0, and an Inval command on the Q1 channel to P1. In the illustrative embodiment, the FReadMod command also carries an inval count of two. The memory controller 424 also updates the directory entry to reflect that P2 is now the owner/sharer of the block and that there are no sharers. The memory controller 424 does not modify the writer field 822. Entry 806*e* (FIG. 8) illustrates how entry 806*d* would appear following the updates performed by the memory controller 424 in response to the ReadMod command from P1.

In response to the FReadMod command, P0 issues a FillMod command that includes the block on the Q2 virtual channel to P2. The FillMod command preferably has an Inval Count of two, reflecting that there are two entities with a copy of the cache line, i.e., P0 and P1. P0 also invalidates its copy of the cache line by de-asserting the cache tag entry's valid flag 608, and sends P2, either individually or as part of the FillMod command, an IAck command on the Q2 channel. In response to the Inval command, P1 also invalidates its copy of the cache line and sends an IAck command to P1. As each IAck command is received at P1, its MAF engine 412 increments the Ack Count field 510 of the corresponding MAF entry 500 by one. When the Inval Count and Ack Count fields 508 and 510 are equal, the cache line is considered to be consistent and may be processed, e.g., read and/or modified, by P2.

Write Back Command

When P2 is finished with the cache line, it writes the cache line back to its home memory subsystem 302*a* in order to make room in its cache for other cache lines. In the illustrative embodiment, the processor module 402*a* (FIG. 4) does not include a separate write-back or victim buffer.

Instead, a cache line that is being victimized from the processor's cache is written-back to memory directly from the cache.

When a processor, such as P2, wishes to write-back a cache line over which it has write access, it first checks the corresponding tag entry 600. Specifically, P2 confirms that the dirty flag 606 and the valid flag 608 are both asserted, thereby indicating that P2 is the owner of the cache line to be written back and that the cache line is still valid. Only those memory blocks that were acquired by a processor with a request for exclusive or write access may subsequently be written back to main memory. If the dirty flag 606 is not asserted and/or the cache line is invalid, P2 is precluded from writing the cache line back to memory. P2 also checks its MAF table 414 to see if a MAF entry 500 already exists for the cache line to be written back. If there is a MAF entry 500, P2 confirms that the entry is inactive, that there are no outstanding IAcks for the cache line, i.e., that the Inval Count field 508 equals the Ack Count field 510, that the read pointer and write pointer fields 512 and 516 are both invalid, and that the MAF state field 520 is set to the idle state. If there are one or more outstanding IAcks or the MAF entry is active, the processor is precluded from writing the cache line back to memory.

Assuming the cache line is valid and dirty, and that MAF entry satisfies the above checks, a processor, such as P2, simply issues a Write_Back (WB) command to main memory in order to write the block back to memory. The WB command, which includes the modified block and its address, is preferably issued on the Q0 virtual channel. The tag entry 600 may then be invalidated and the entry made available to store a new cache line. No copy of the cache line being written back is kept at processor P2 upon issuance of the WB command. In the preferred embodiment, the processor P2 also creates a new entry 500 in the MAF table 414 for the WB command. The processor P2 asserts the active field 502, enters the opcode associated with the WB command into the command field 504 and enters the block's address into the address field 506.

The WB command is routed by the SMP system 300 to the block's home memory subsystem 302a. At the memory subsystem 302a, the memory controller 424 responds to the WB command by storing the modified data appended to the WB command in memory device 422 overwriting the previous contents of the memory block. The memory controller 424 also updates the directory entry's write-back region 804. Specifically, the writer field 822 of the directory entry, i.e., entry 806e, for the block being written back is updated with the PID of the processor that issued the WB command, i.e., processor P2. Significantly, neither the memory controller 424 nor the processor make any change to the directory entry's owner/sharer field 814. Entry 806f (FIG. 8) illustrates how entry 806e would appear following the write-back operation by P2.

In addition to storing the modified data at the memory device 422, the memory controller 424 preferably computes a new ECC value for the data and stores this new ECC value along with the block. Furthermore, because it has changed the contents of the write-back region 804, the memory controller 424 also computes a new ECC value for the information in region 804 and stores this new value in the ECC field 826.

After updating the entry's writer field 822, the memory controller 424 returns a WB_Acknowledgement (WB_Ack) command to P2. The WB_Ack is preferably issued on the Q2 virtual channel, although it may alternatively be issued on the Q1 virtual channel. In response to receiving the WB_Ack command, P2 causes the MAF entry 600 that was created for the WB command to be deactivated, e.g., by de-asserting the active field 502.

Suppose that, following P2's write-back of the block, some other processor in the SMP system 300, e.g., processor P3, now issues a Read command for the block. As described above, the Read command is routed by the SMP system 300 to the block's home memory subsystem 302a. The memory controller 424 responds to the Read command by accessing the directory entry, i.e., entry 806f, for the block. The memory controller 424 compares the contents of the owner/sharer field 814 with the contents of the writer field 822. Because the WB command from P2 modified the writer field 822 but not the owner/sharer field 814, the values in the two fields are now the same, i.e., they both contain P2's PID. As the values stored in the two fields 814, 822 are the same, the memory controller 424 concludes that it is the owner of the requested block, and that it has the most up-to-date version in its memory device 422. Controller 424 reaches this conclusion even though the owner/sharer field 814 does not indicate memory as the owner of the block. Because the two fields 814, 822 contain the same value, the memory controller 424 responds to the Read command from processor P3 by issuing a Fill command on the Q2 channel which includes a copy of the block taken from its memory device 422. The memory controller 424 also updates the directory entry by adding P3 to the sharer list field 816. The memory controller 424 does not modify either the owner/sharer field 814 or the writer field 822. Entry 806g (FIG. 8) illustrates how entry 806f would appear following the Read command from processor P3.

Except for the condition noted below, the writer field 822 of the directory's write-back region 804 is only modified in response to a WB command from a processor (or other system entity) performing a write-back of data to memory. The WB command, moreover, does not result in the contents of the owner/sharer field 814 being read or modified. The memory controller 424, moreover, updates the contents of a directory entry immediately in response to the received command, e.g., Read command, ReadMod command, WB command, etc. Such updates are not dependent upon the memory controller 424 receiving additional information, such as ACKs, from system entities.

It should be understood that write-backs must be strictly serialized. That is, at any point in time, the cache coherency protocol ensures that only a single processor can issue a WB command for a given memory block. In the illustrative embodiment, this is accomplished by permitting only a single entity to have write or exclusive access to a given memory block. A second entity requesting write access over the given memory block is not granted such access until the previous owner has either been invalidated or has written the memory block back to main memory. Accordingly, at any given point in time, the cache coherency protocol permits only a single entity to issue a WB command for a given memory block.

Invalidate to Dirty

As indicated above, a memory block or cache line, which may be 128-bytes, is the minimum unit of information, e.g., data and/or instructions, that is moved about the SMP system 300. When an entity intends to write to something less than a full memory block, such as a quadword which is 32-bytes, it typically issues a ReadMod command, and in response receives the full memory block including the 32-bytes of interest. The entity then writes the new data to the identified quadword, leaving the remaining portions of the memory block unchanged. The entire memory block, including the modified quadword, can then be written back to main memory. If an entity, such as a processor or an I/O subsystem on behalf of a peripheral device, intends to write the entire contents of a memory block, e.g., in connection with a direct memory access (DMA) write transaction, it may issue an Invalidate_to_Dirty (I2D) command. Since the entity is writing to the entire memory block, it does not care what the current version of the memory block is.

When an I2D command is received at the block's home memory subsystem, the memory controller 424 retrieves the respective directory entry, and issues Invals to the owner and sharer(s), if any, thereby causing them to invalidate their copies of the block. The memory controller also enters the ID assigned to the source of the I2D command in the entry's owner field, and returns a Success command to the source of the I2D command. The Success command specifies how many entities had a copy of the block in their caches. Upon invalidating their copies of the block, the owner and sharers, if any, issue IAcks to the entity that sourced the I2D command. Once the source has received the Success command and an IAck from each entity that had a copy of the block, it can write the new data to memory by appending the modified data to a WB command. The memory controller responds to the WB command with a WB_Ack command.

Full Block Write

A Full_Block_Write (FBW) command, like an I2D command, is typically utilized by an I/O subsystem when performing a DMA write transaction. However, unlike the I2D, which does not carry data, the FBW command carries the new memory block being written. At the home memory subsystem, the memory controller 424 retrieves the respective directory entry. The memory controller 424 issues Invals to the owner and sharer(s), if any, thereby causing them to invalidate their copies of the block. The memory controller 424 also enters the ID assigned to the source of the FBW command in the directory entry's owner and writer fields and stores the data in main memory. The block's previous owner and sharer(s), if any, respond to the Invals by invalidating their copies of the memory block and issuing IAcks to the source of the FBW command. The source collects the IAcks for consistency purposes.

As shown, the processors 404 and directories 426 cooperate to execute a generalized low occupancy cache coherency protocol. The protocol is "generalized" in that it can support processors that share memory blocks that are in a dirty state as well as processor that are precluded from sharing memory blocks that are in the dirty state. A dirty-shared processor responds to a snoop read, e.g., a FRead command, identifying a block in the dirty state by sending a copy of the block from its cache to the source of the snoop read. The dirty-shared processor does not, in response to the snoop read, write a copy of the block back to main memory. Accordingly, multiple processors may have a "dirty" copy of a memory block in their caches, although only one processor, the owner, can write the block back to main memory. Non-dirty shared processors do not support dirty blocks being held in more than one cache. In particular, if a non-dirty shared processor receives a snoop read identifying a block in the dirty state, the processor typically writes the block back to main memory, thereby requiring the source of snoop read to obtain a copy of the block from memory. Alternatively, the non-dirty shared processor may return the dirty block to main memory but also forward a copy of the block from its cache to the source of the snoop read. As described in co-pending application Ser. No. 10/263,741, filed Oct. 3, 2002 and titled COMPUTER SYSTEM SUPPORTING BOTH DIRTY-SHARED AND NON-DIRTY-SHARED DATA PROCESSING ENTITIES, which is hereby incorporated by reference in its entirety, the illustrative cache coherency protocol supports both types of processors.

The protocol is also considered a "low occupancy" protocol, because of the following attributes. First, each command only has to access the directory 426 once. Second, directory changes are deterministic based on the current directory state and the type of the received command. That is, the resulting state or form of a directory entry is solely a function of the current state or form of the entry and the received command. Third, the directory 426 neither creates nor requires any transient states or the return of acknowledgements in order to maintain coherency. Accordingly, once the directory 426 has updated the appropriate fields and issued the required commands, e.g., ReadMods, Invals, etc., it can immediately process another command for the same memory block even though the previous commands have yet to reach their targets.

It should be understood that each memory controller 424 represents a serialization point for the memory blocks stored at its memory subsystem 302, as the memory controller 424 preferably processes one received command at a time. However, in the SMP system 300 of the illustrative embodiment, there is no central or single serialization point for the entire shared memory.

In accordance with the preferred embodiment of the present invention, the virtual channels, i.e., the logic, fabric links, and other resources on which the virtual channels are built, must guarantee delivery of all commands within the SMP system 300. The cache coherency protocol assumes that all commands issued in connection with a memory reference operation will be received by their intended targets.

In the preferred embodiment, the SMP system 300 implements a relaxed consistency model. Specifically, the data processing entities of the SMP system, such as the processors, are configured or programmed to treat IAcks as consistency markers, but may read or write data, e.g., memory blocks, independent of consistency markers. That is, a processor may service a snoop targeting a given memory block, even though the processor is still waiting to receive one or more IAcks for the given memory block. Similarly, a processor may fill a cache line with a received memory block and modify it, even though the processor is still waiting to receive one or more IAcks for the received block. The data processing entities must, however, await completion of all pending consistency markers, e.g., IAcks, in response to fence or memory barrier (MB) operations.

Resolving Ambiguous Invalidates

As described above, the memory controllers 424 preferably do not issue marker messages upon accessing the directory 426. Furthermore, the virtual channels are not implemented as ordered channels. This significantly improves system performance by reducing the communication overhead. It also allows the system designer to select any advantageous interconnect fabric or topology. Nonetheless, as indicated above, it may result in the receipt of ambiguous invalidates by system entities, such as processors. The present invention is directed to a system and method for resolving what might otherwise be ambiguous invalidates.

FIGS. 11A–D illustrate an exemplary exchange of messages for resolving potentially ambiguous invalidates.

Figure 11A:
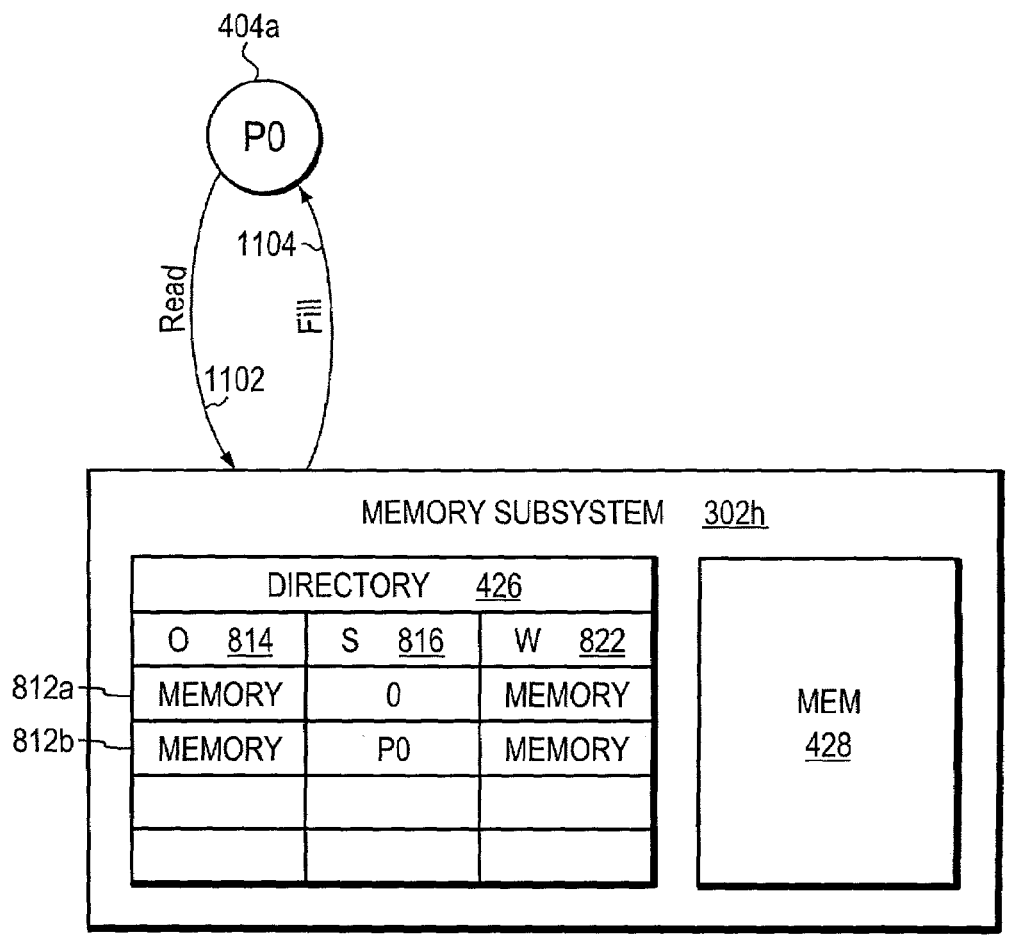
FIGS. 11, 13 and 14 illustrate exemplary message exchanges among a plurality of processors and a memory subsystem.

Referring to FIG. 11A, suppose a processor, e.g. processor P0 also designated by reference numeral 404a, issues a Read command 1102 on the Q0 virtual channel for a specified memory block. The Read command 1102 is routed to the home memory subsystem, e.g. memory subsystem 302*h*, having a directory 426 and one or more memory devices (MEM) 428. P0 also generates an entry in its MAF table 414 to track the outstanding Read command 1102. The memory controller 424 (FIG. 4) accesses the directory entry, e.g., entry 812*a* (FIG. 11A), for the specified memory block. Directory entry 812*a* indicates that memory is both the owner and last writer of the specified memory block, and that there are no sharers. Accordingly, the memory controller 424 issues a Fill command 1104 on the Q2 virtual channel to processor P0 that includes a copy of the block from memory 428, and updates the directory entry by inserting P0's PID in the sharer field 816. Entry 812*b* (FIG. 11A) illustrates how entry 812*a* would appear following the completion of the Read command 1102 from processor P0.

In response to the Fill command 1104, a selected line of P0's cache is filled with the block, P0's cache tag storage device 406 is updated and the MAF entry is cleared. In particular, the block's address is loaded into the tag field 602, and the valid and shared flags 608, 604 of the respective cache tags entry 600 are both asserted to reflect that the block, as residing in P0's cache, is valid and is in the shared state. P0 may then utilize the block or some portion thereof in its processing. Suppose P0 then wants to remove the block from its cache to make room for a new block. P0 preferably replaces cache line containing the block with the new block received by P0 and updates the respective entry of the cache tags storage device 406, i.e., the tag field 602 is loaded with the address of the new block. P0 preferably does not return a victim message, such as a Victim_Clean command, to the directory 426. Accordingly, the current directory entry 812*b* for the block indicates that P0 continues to have a shared copy of the block.

Now, suppose another processor, e.g., processor P1 also designated by reference numeral 404*b* (FIG. 11B), issues a request for exclusive or write access, such as ReadMod command 1106 on the Q0 virtual channel, for the same memory block to which processor P0 obtained read access. The ReadMod command 1106 from processor P1 is routed to home memory subsystem 302*h*, and the memory controller 424 accesses the directory entry, i.e., entry 812*b*. Directory entry 812*b* indicates memory as the current owner and last writer, thereby indicating that memory is the current owner of the block. Entry 812*b* further indicates that P0 has a shared copy of the block. In this case, the memory controller 424 issues a FillMod command 1108 on the Q2 virtual channel to P1 that includes a copy of the block taken from memory 428. The memory controller 424 also issues an Invalidate (Inval) command 1110 on the Q1 virtual channel to P0 instructing it to invalidate the shared copy of this memory block which, as far as the memory controller 424 knows, is still stored at P0's cache.

Suppose further that, before Inval command 1110 is received at P0, P0 realizes that it needs the block again. Because the block was victimized from P0's cache, P0's request results in a cache miss. To obtain a copy of the block again, P0 issues another Read command 1112 (FIG. 11B) on the Q0 virtual channel. To keep track of the outstanding Read command 1112, P0's MAF controller 412 creates a new MAF entry in its MAF table 414. FIG. 12 is a highly schematic illustration of the MAF entry 1202 created for the Read command 1112. Line 1202*a* corresponds to the first instance of MAF entry 1202. Specifically, MAF controller 412 asserts the active field 502, specifies the opcode associated with the outstanding command, i.e., Read, in the command field 504, and enters the physical memory address in address field 506. Fields 508–520 and 522 are each set to zero. The Fill state field 520 is set to the Active state, thereby reflecting that P0 is awaiting the receipt of a Fill command with a copy of the block.

Figure 11B:
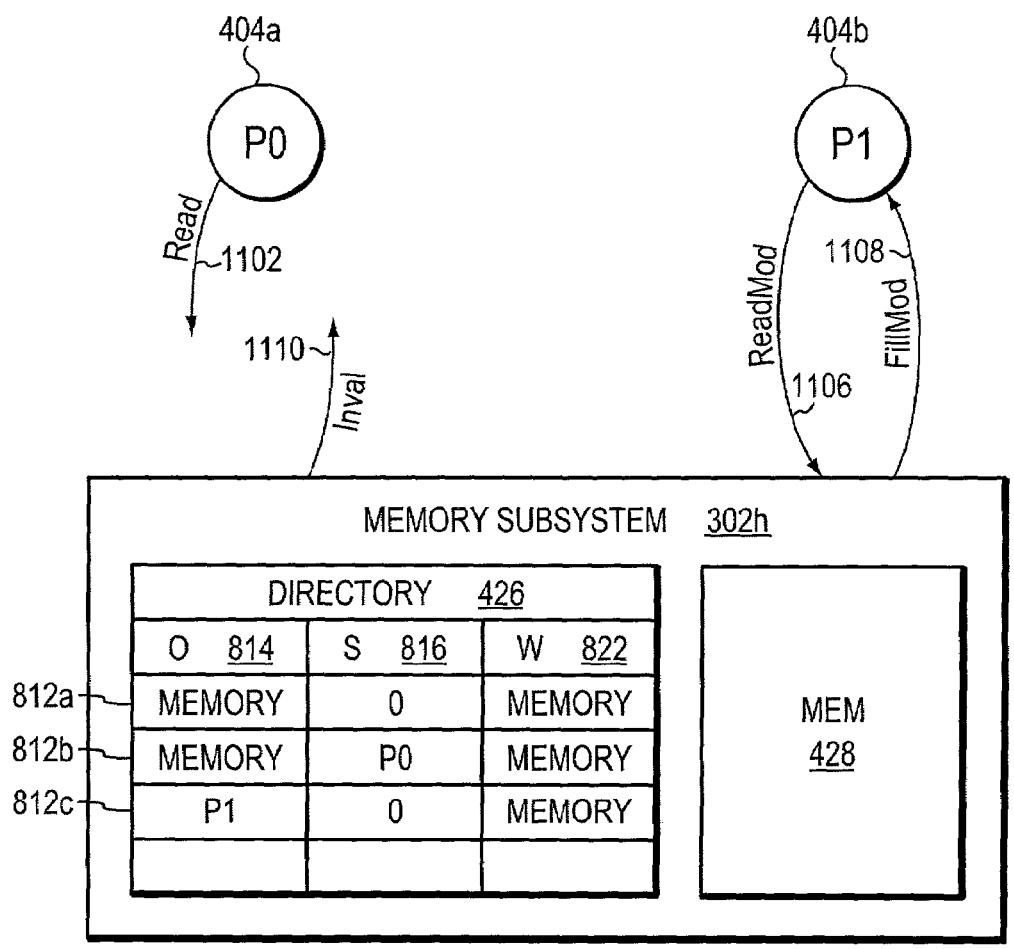

When the Inval command reaches P0, it is placed in the probe/response queue 410. The Inval command 1110 does not hit on any cache entry at P0 because P0 does not have a copy of the block in its cache. In particular, P0 victimized the copy it received in response to its earlier Read command 1102 (FIG. 11A), and has yet to receive another copy of the block in response to the current Read command 1112 (FIG. 11B). The Inval command 1110 does, however, hit on MAF entry 1202*a*, which was created to track Read command 1112. P0, however, is unable to determine whether the Inval command 1110 refers to the version of the block that P0 victimized from its cache (which happens to be the case in this example) or to the version that P0 expects to receive in response to its current Read command 1112. This ambiguity arises, at least in part, because the SMP system 300, in order to improve design flexibility and performance, employs neither markers nor ordered virtual channels.

If the Inval applied to the version P0 is expecting to receive and P0 simply ignored it, assuming the Inval applied to an earlier victimized version of the block, the SMP system 300 might deadlock. That is, another entity expecting to receive an IAck from P0 would never receive such an IAck because P0 incorrectly resolved the Inval by ignoring it, thereby causing the system 300 to deadlock.

Figure 10:
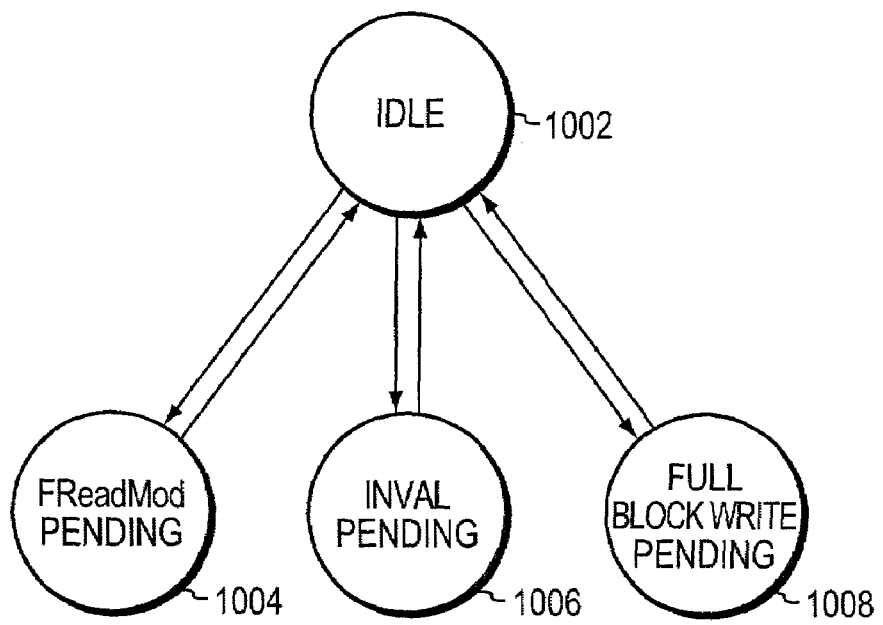

To resolve this ambiguity correctly, P0 assumes a worst case scenario and treats the received Inval command 1110 as applying to the version of the block that it will be receiving in response to its outstanding Read command 1112. That is, in accordance with the present invention, the entities of the SMP system 300, including the processors, assume that such ambiguous Inval commands apply to the requested version of the respective block as represented by the corresponding MAF entry. In response, the entity stores the received Inval command in its MAF and replays the Inval command upon receipt of the block. Continuing with the present example, Inval command 1110 is received at P0's probe/response queue 410. As mentioned above, the Inval command 1110 misses on P0's cache, but hits on MAF entry 1202*a* (FIG. 12). In response, the write chain state machine 420 at P0 transitions the write chain state associated with MAF entry 1202*a* from the Invalid state 1002 (FIG. 10) to the Inval_Pending state 1006. State machine 420 records this new state in the MAF entry's write chain state field 518. The state machine 420 also enters an identifier associated with the entity expecting to receive the IAck from P0 in the MAF entry's write pointer field 516. Here, processor P1 is expecting to receive an IAck from P0. Accordingly, state machine 420 loads P1's PID into the write pointer field 516. MAF entry 1202*b* (FIG. 12) illustrates how entry 1202*a* would appear in response to Inval command 1110.

Figure 11C:
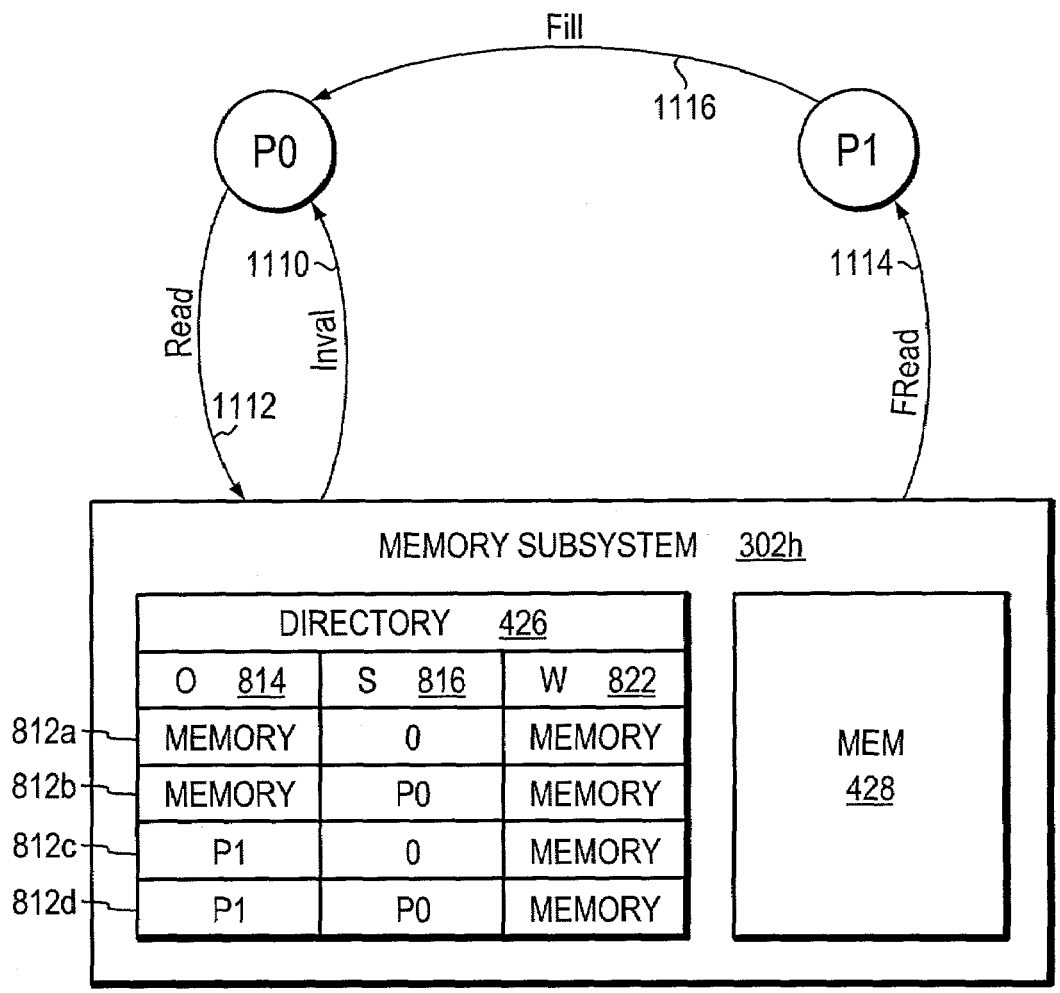
Figure 11D:
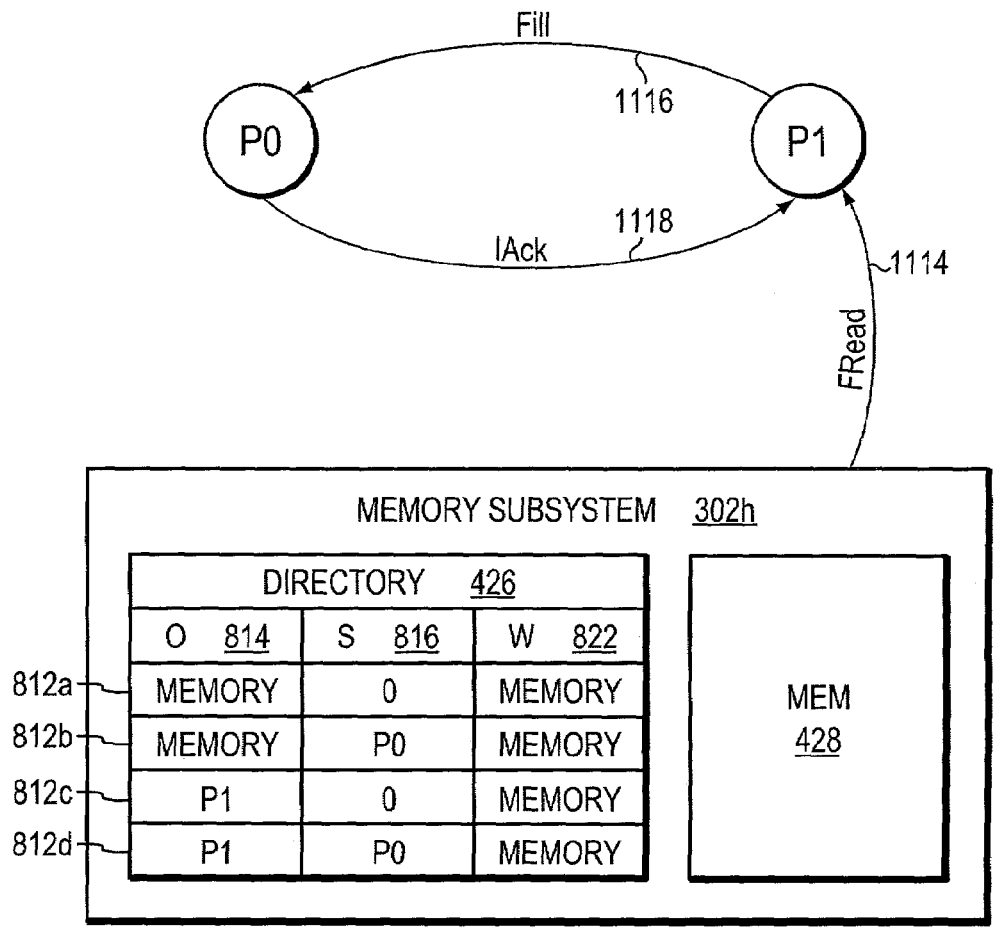

Referring to FIG. 11C, when P0's Read command 1112 reaches the home memory subsystem 302*h*, the memory controller 424 accesses the directory entry, i.e., entry 812*c*, for the requested memory block. As the owner field 814 and writer field 822 specify different entities, the memory controller concludes that the entity identified in the owner field 814, i.e., processor P1, is the block's owner. Memory controller 424 thus issues an FRead command 1114 on the Q1 virtual channel to P1 instructing P1 to send a copy of the block to P0 out of P1's cache. The memory controller 424 also adds P0's PID to the directory entry's sharer list field 816. Directory entry 812*d* illustrates how entry 812*c* would appear following the memory controller's processing of the Read command 1112 from processor P0.

The FRead command 1114 is received at P1 and placed in its probe/response queue 410. The FRead command 1114 hits on a cache entry at P1 as P1 had received the block as part of the FillMod command 1108 (FIG. 11B) from the home memory system 302h, and had placed the block in its cache. As the SMP system 300 is configured to implement a relaxed consistency model, P1 places the received block in its cache, utilizes it and modifies it, even though P1 was notified in the FillMod command 1108 that some other entity, i.e., processor P0, had a copy of the block and that P1 would be receiving an IAck confirming that this other entity had invalidated its copy of the block. As P1 has a copy of the requested block in its cache, it also responds to the FRead command 1114 by sending a copy of the block to the identified entity, i.e., processor P0, even though P1 is still awaiting one or more IAcks. Specifically, processor P1 issues a Fill command 1116 on the Q2 virtual channel to P0 that includes a copy of the block from P1's cache.

The Fill command 1116 is received at P0 and buffered in its probe/response queue 410. MAF controller 412 determines that the Fill command 1116 corresponds to MAF entry 1202b (FIG. 12). P0's fill state machine engine 416 transitions the Fill state associated with MAF entry 1202b from the active state to the idle state. MAF controller 412 also places the block in P0's cache and asserts both the shared and valid flags 604, 608 of the respective cache tag entry so that P0 can utilize the block and thus make progress. The MAF controller 412 then examines the read chain state and the write chain state associated with the MAF entry 1202b. The entry's read chain state is in the invalid state 1102, thereby indicating that P0 has received no FRead commands for the block. The entry's write chain state is in the Inval_Pending state 1006 as provided in the write chain state field 518, and the write pointer field 516 indicates processor P1. P0 responds to this write chain state by "replaying" the Inval command 1110 (FIG. 11C). Specifically, P0 invalidates the block received with the Fill command 1116 by de-asserting the valid field 608 of the respective cache tag entry. P0 then issues an IAck command 1118 (FIG. 11D) on the Q1 virtual channel to P1 confirming P0's invalidation of the block.

Upon replaying the stored Invalid command, P0's write chain state machine 420 transitions the write chain state of MAF entry 1202b from the Inval_Pending state 1006 to the Invalid state 1002. Furthermore, upon issuing the IAck command 1118, the MAF controller 412 asserts, e.g., changes to Yes, the write done field 522 of the MAF entry 1202b and de-asserts, e.g., changes to No, the active field 502. MAF entry 1202c (FIG. 12) illustrates how entry 1202b would appear following the processing of the Fill command 1116 at P0.

The IAck command 1118 is received at P1 and placed in its probe/response queue 410. P1's MAF controller 412 accesses the MAF entry that was created for the ReadMod command 1106 (FIG. 1B) issued by P1 and increments by one the Ack Count field 510. As described above, the MAF entry's Inval Count field 508, which was set as specified by the FillMod command 1108 (FIG. 11B) from the home memory subsystem 302h, also indicates one. Accordingly, the entry's Inval Count field and Ack Count field are now set to the same value. The block is thus consistent in the SMP system 300.

It should be understood that if an entity, such as a processor, receives an Inval command that does not collide with a pending MAF entry and misses on the entity's cache, the entity simply responds by issuing an IAck command to the specified entity. In this case, the entity concludes that the Inval command must refer to a version of the block that the entity victimized from its cache without notifying the directory. That is, Inval commands received under these circumstances are not ambiguous invals. The Inval command, moreover, is not stored in the MAF table for replaying.

It also should be understood that if an entity of the SMP system 300 receives a regular or vanilla Invalidate (Inval) command that collides with a MAF entry that was created to track a request for write access to the block, e.g., a ReadMod command, then the entity again simply responds by issuing an IAck command to the specified entity. Here, the entity receiving the Inval command knows that it must apply to a version of the block that the entity has since victimized from its cache. If the memory controller sought to invalidate the copy of the memory block that the entity is expecting to receive in response to its ReadMod command, the memory controller would have issued a command other than an Inval command, such as a FReadMod command.

Nonetheless, in some circumstances, a memory controller may wish to simply invalidate an owner's copy of a memory block. For example, if an entity, such as a processor or an I/O bridge, intends to write the entire contents of a memory block, it may issue an Invalidate_To_Dirty (I2D) command. Since the entity is writing to the entire memory block, it does not care what the current version of the memory block is. Accordingly, in response to an I2D command, the memory controller at the selected block's home memory subsystem issues invalidates to the block's owner, if any, and to each of the sharers. The memory controller also returns a Success command to the entity that issued the I2D command that specifies how many entities had a copy of the block and thus how many IAcks the entity will be receiving. Each entity receiving an invalidate from the home memory subsystem invalidates its copy of the memory block and issues an IAck to the source of the I2D command.

To distinguish a regular or vanilla Inval command, that is typically utilized to invalidate a read access copy of a memory block, from an Inval command intended to invalidate a write access copy of a memory block without having to forward the block itself, the present invention provides for a new Inval command, preferably an Owner_Invalidate (OwnerInval) command. When a home memory subsystem receives an I2D command, it issues an OwnerInval command to the designated block's owner, and regular or vanilla Inval commands to the block's sharers. If an entity, such as a processor, receives an OwnerInval command that collides with a MAF entry tracking a request for write access to the memory block, such as a ReadMod command, the entity preferably stores the OwnerInval command in the MAF entry for replaying upon receipt of the block, as described above in connection with the receipt of FReadMod commands. In this case, however, rather than issue a FillMod command that includes a copy of the block to the entity that triggered the FReadMod command, the processor issues an IAck that does not include the block to the entity that sourced the I2D command.

It should be understood that the OwnerInval command may also be used in response to the home memory subsystem receiving a Full_Block_Write command designating a block that is owned by some entity. A Full_Block_Write (FBW) command, like an I2D command, is typically utilized by an I/O subsystem when performing a DMA write transaction. However, unlike the I2D, which does not carry data, the FBW command carries the new memory block being written by the I/O subsystem.

In an alternative embodiment, entities of the SMP system 300, such as processors 404, are designed not to forward copies of blocks over which the entities have write access when there are one or more IAcks are still outstanding. That is, the processors hold off on sending copies of such blocks to other processors until all IAcks have been received.

Figure 13A:
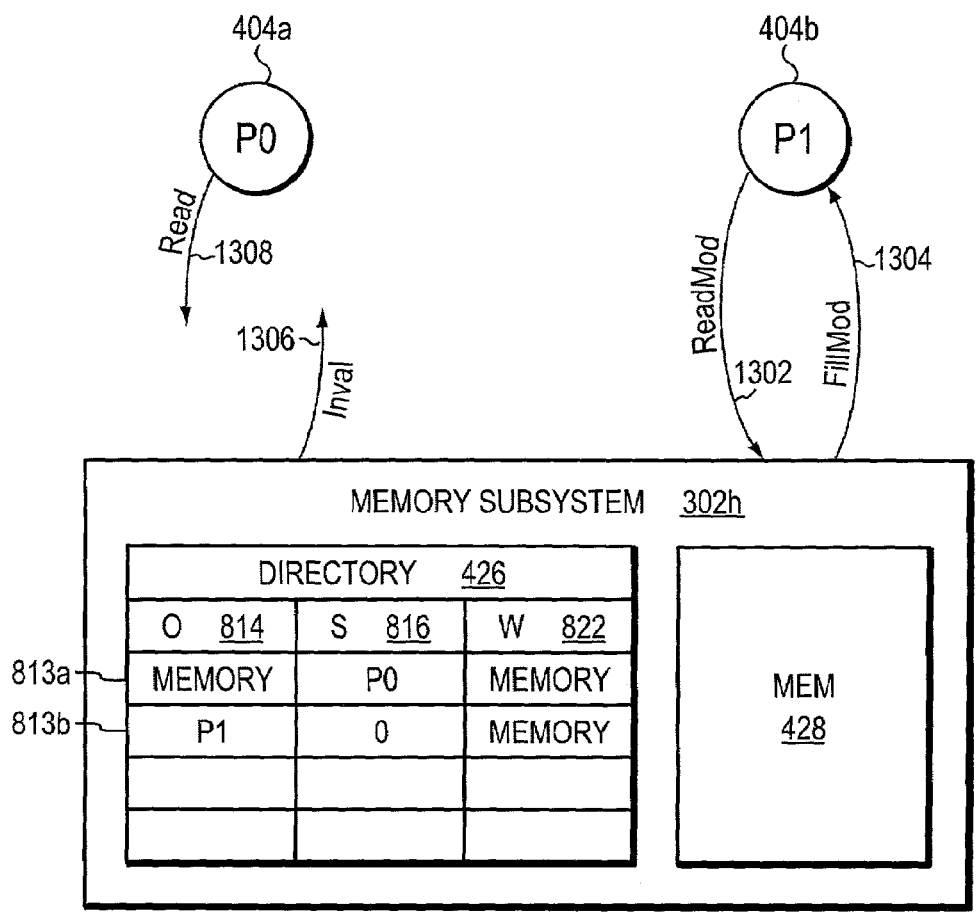
Figure 13B:
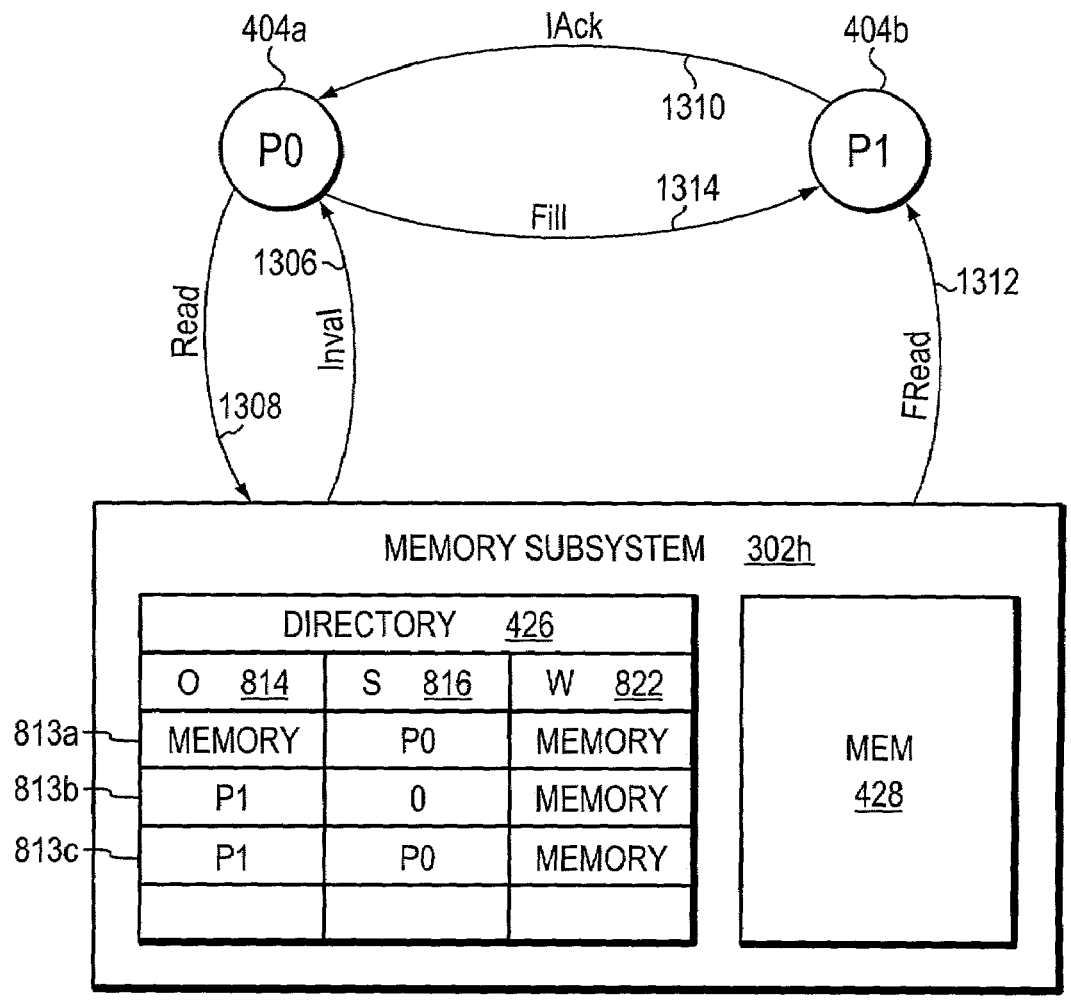

FIGS. 13A–B is an exemplary illustration of a message sequence in accordance with this embodiment. Suppose, for example, that processor P1 also designated by reference numeral 404b (FIG. 13A), issues a request for exclusive or write access, such as ReadMod command 1302 on the Q0 virtual channel, for a memory block that processor P0 previously had stored in its cache, but has since victimized without notification to the directory. The ReadMod command 1302 from processor P1 is routed to memory subsystem 302h, and the memory controller 424 accesses the directory entry, i.e., entry 813a. Directory entry 812b indicates memory as both the owner and last writer, thereby indicating that memory is the owner of the block. Furthermore, although P0 victimized its shared copy of the block, directory entry 318a nonetheless indicates that P0 has a shared copy of the block, as the directory was not notified of the fact that P0 victimized its copy of the block. In this case, the memory controller 424 issues a FillMod command 1304 on the Q2 virtual channel to P1 that includes a copy of the block taken from memory 428. The memory controller 424 also issues an Invalidate (Inval) command 1306 on the Q1 virtual channel to P0 instructing it to invalidate the shared copy of this memory block which, as far as the memory controller 424 knows, is still stored at P0's cache. Because directory entry 813a indicates that P0 has a copy of the block in its cache, FillMod command 1304 specifies an Inval count of one.

The memory controller 424 also updates the directory entry 813a to reflect that P1 is the block's owner and that there are no sharers. Directory entry 813b illustrates how entry 813a would appear following the update.

When the FillMod command 1304 is received at P1, the block is initially stored at MAF buffer 422. The Inval Count field 508 of the MAF entry that was created at P1 to track ReadMod command 1302 is set to one as specified in the received FillMod command 1304. As the Ack Count field 510 is at zero, P0 "knows" to expect a single IAck for this block. In this embodiment, the processors of the SMP system 300, including P1, are precluded from storing any memory blocks in their caches when there are one or more IAcks still pending for the blocks. As there is an IAck pending for the block received in the FillMod command 1304 from the home memory subsystem 302h, P1 leaves the received block in MAF buffer 422 and does not transfer it into P1's cache. Leaving the block in the MAF buffer 422 prevents P1 from utilizing the contents of the block in its process or thread.

Now, suppose again that, before Inval command 1306 is received at P0, P0 realizes that it needs the block again. Accordingly, P0 issues a Read command 1308 on the Q0 virtual channel. To keep track of the outstanding Read command 1308, P0's MAF controller 412 creates a new MAF entry in its MAF table 414. The MAF controller 412 asserts the active field 502, specifies the opcode associated with the outstanding command, i.e., Read, in the command field 504, and enters the physical memory address in address field 506. Fields 508–520 and 522 are each set to zero. The Fill state field 520 is set to the Active state, thereby reflecting that P0 is awaiting the receipt of a Fill command with a copy of the block.

When the Inval command 1306 reaches P0, it is placed in the probe/response queue 410. The Inval command 1306 does not hit on any cache entry at P0 because P0 victimized its earlier copy of the block and has yet to receive another copy in response to its Read command 1308. The Inval command 1306 does, however, hit on the MAF entry at P0 that was created to track Read command 1308. As before, however, P0 is unable to determine whether the Inval command 1306 refers to the previously victimized version of the block or to the version that P0 expects to receive in response to Read command 1308. In other words, Inval command 1306 is an ambiguous inval. In this embodiment, P0 responds to the Inval command 1306 by immediately issuing an IAck command 1310 (FIG. 13B) on the Q1 virtual channel to the entity specified in the Inval command 1306, i.e., P1. That is, P0 responds with the IAck before it has received the block.

In addition to issuing the IAck command 1310, P0 also stores the received Inval command in its MAF. Specifically, P0's write chain state machine 420 transitions the write chain state associated with MAF entry from the Invalid state 1002 to the Inval__Pending state 1006, and records this new state in the MAF entry's write chain state field 518.

The IAck command 1310 is received at P1 and placed in its probe/response queue 410. P1's MAF controller 412 accesses the MAF entry that was created for the ReadMod command 1302 (FIG. 13A) and increments by one the Ack Count field 510. As described above, the MAF entry's Inval Count field 508 also indicates one. Accordingly, the entry's Inval Count field and Ack Count field are now set to the same value. The block is thus consistent in the SMP system 300. Once this condition is satisfied the MAF controller 412 preferably transfers the block from the MAF buffer 422 to P1's cache. The block's address in entered in the tag field 602 of the corresponding entry in the cache tags storage device 406, the valid field 608 is asserted and, upon modification of the block by P1, the dirty flag 606 is asserted.

When P0's Read command 1308 reaches the home memory subsystem 302h, the memory controller 424 accesses the directory entry, i.e., entry 813b, for the requested memory block. As the owner field 814 and writer field 822 specify different entities, the memory controller 424 concludes that P1 which is the entity identified in the owner field 814 is the block's owner. Memory controller 424 thus issues an FRead command 1312 on the Q0 virtual channel to P1 instructing P1 to send a copy of the block to P0 out of P1's cache. The memory controller 424 also adds P0's PID to the directory entry's sharer list field 816. Directory entry 813c illustrates how entry 813b would appear following the memory controller's processing of the Read command 1308 from processor P0.

The FRead command 1312 is received at P1 and placed in its probe/response queue 410. The FRead command 1312 hits on a cache entry at P1 as P1 transferred the block from its MAF buffer 422 to the cache upon receipt of the IAck command 1310 from P0. As P1 has a copy of the requested block in its cache, it responds to the FRead command 1312 by sending a copy of the block to the identified entity, i.e., processor P0. Specifically, processor P1 issues a Fill command 1314 on the Q2 virtual channel to P0. The Fill command 1314 includes a copy of the block taken from P1's cache.

The Fill command 1314 is received at P0's probe/response queue 410. The MAF controller 412 determines that the Fill command 1314 corresponds to the MAF entry created to track Read command 1308, and stores the block in the MAF buffer 422. P0's fill state machine engine 416 transitions the Fill state associated with the MAF entry from the active state to the idle state. The MAF controller 412 then examines the read chain state and the write chain state associated with the MAF entry. The entry's read chain state is in the invalid state 1102, thereby indicating that P0 has received no FRead commands for the block. The entry's write chain state, however, is in the Inval_Pending state 1006 as reflected in the write chain state field 518, thereby indicating that P0 received an Inval command targeting this block. In this case, the MAF controller 412 transfers the block from MAF buffer 422 into both a processor register and P0's cache through an atomic Fill_To_Invalid operation. More specifically, the MAF controller 412 places the block in a processor register and in a free line of P0's cache and, as part of the same operation, deasserts the valid flag 608 of the entry in the cache tags storage device 406 associated with the selected cache line. By filling the cache with the memory block and invalidating it all in one atomic operation, the MAF controller 412 prevents P0 from subsequently re-reading the block from its cache. If P0 wanted to re-read this block, it would have to go back to the system to get another copy of the block. Nonetheless, by also placing the block in a processor register, P0 can use the block and thus make forward progress.

P0's write chain state machine 420 then transitions the write chain state of MAF entry from the Inval_Pending state 1006 to the Invalid state 1002, asserts, e.g., changes to Yes, the write done field 522 and de-asserts, e.g., changes to No, the active field 502 of the MAF entry.

Suppose instead of the foregoing that P0's Read command 1308 arrives at the home memory subsystem 302h before P1's ReadMod command 1302, but that the Inval command 1306 issued in response to P1's ReadMod command 1302 reaches P0 before the Fill command from the home memory subsystem 302h. In this example, because P0's Read command reaches the home memory subsystem 302h before P1's ReadMod command, the memory controller satisfies the Read directly from memory device 428. The Inval is again ambiguous, however, as P0 does not know if it applies to the earlier victimized version of the block or the new version that it is waiting to receive in the Fill command from the home memory subsystem 302h. Upon receipt of the Inval, P0 responds with an IAck to P1 then, when the block is received at P0, the Fill_To_Invalid operation causes it to be loaded into a processor register and into P0's cache in the invalid state all in one atomic operation. P0 is thus prevented from re-reading the block out of its cache. This is important because P1 has write access to the block making the version received at P0 stale.

In a further aspect of the present invention, the memory controllers 424 are configured to issue two different types of Invalidate commands. Specifically, the memory controllers 424 issue regular or "vanilla" Invalidate commands to owners, and Invalidate_If_Clean commands to all of the non-owner, sharers, if any. Entities can utilize the different types of invalidate commands to resolve any ambiguity that may arise in connection with the receipt of invalidates.

Figure 14A:
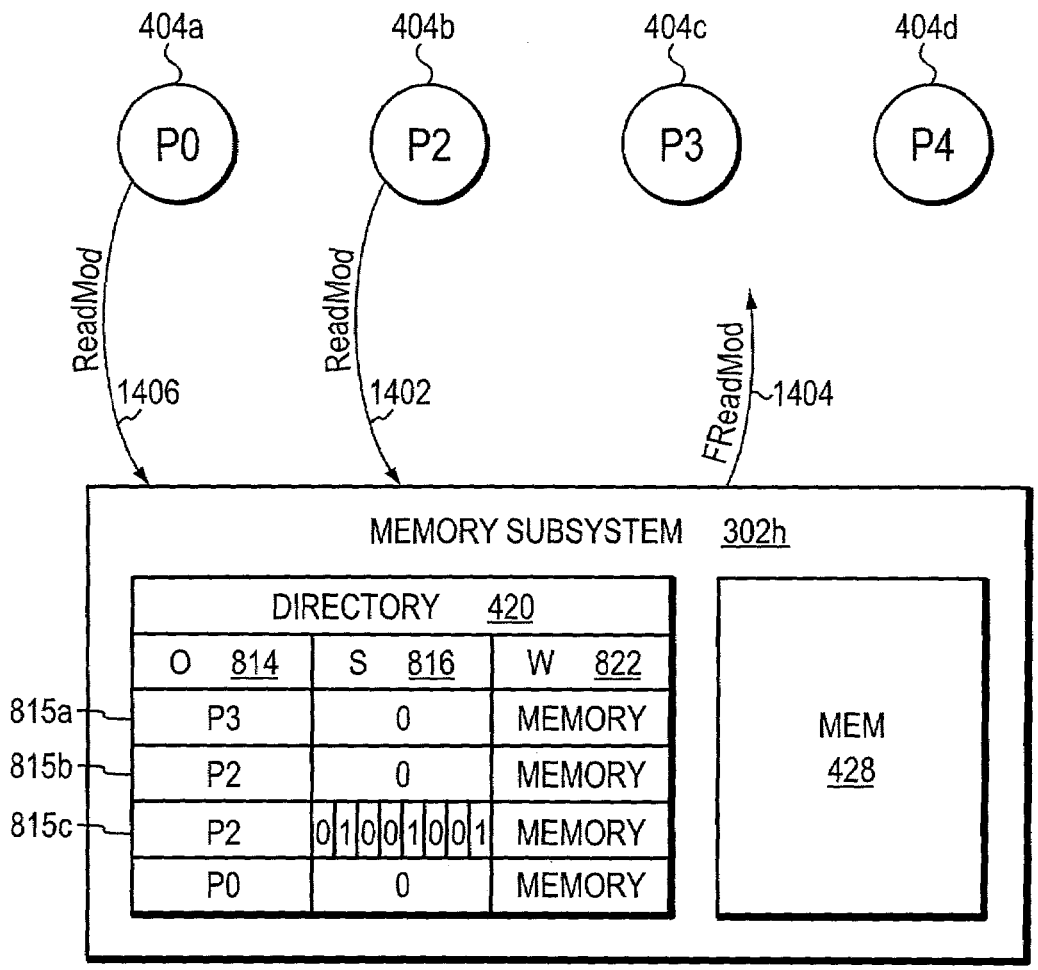
Figure 14B:
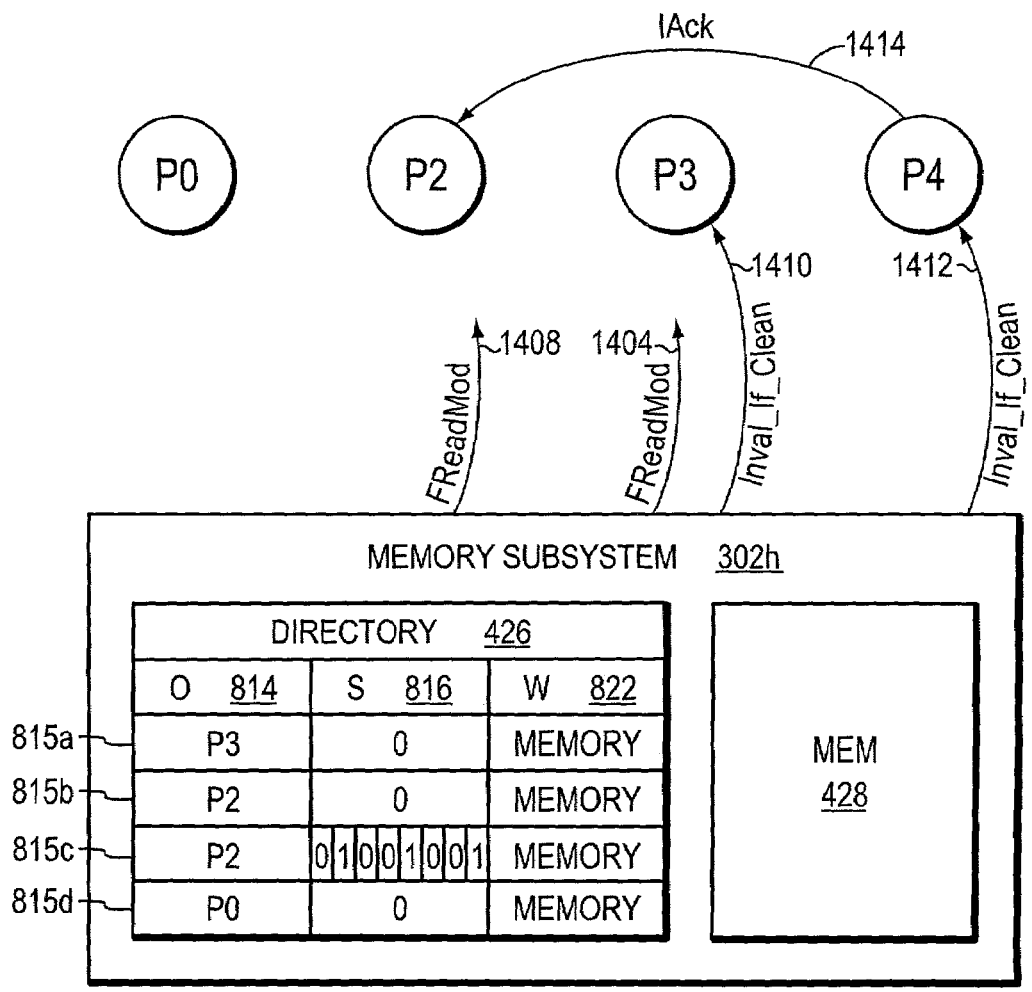
Figure 14C:
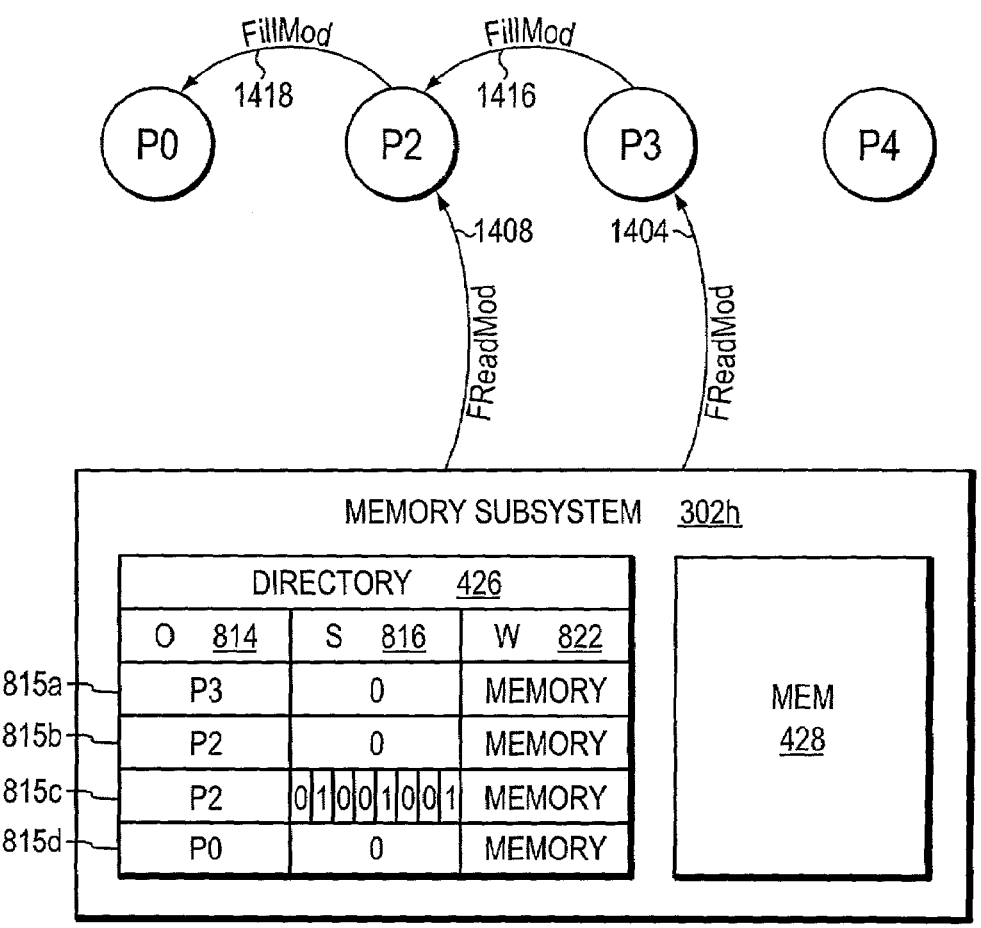

FIGS. 14A–C are a highly schematic illustration of an exemplary exchange of commands among a plurality of data processing entities, such as processors, and a memory subsystem in accordance with this embodiment of the invention. Suppose an entity, such as processor P3 also designated by reference numeral 404c (FIG. 14A), is the current owner of a memory block, and that no other entities have a shared copy of the block. Accordingly, in P3's cache tag storage device entry for this block, the dirty flag 606 (FIG. 6) is asserted to indicate that the version of the block in P3's cache is in the dirty state. Now, suppose that another entity, such as processor P2 also designated by reference numeral 404b issues a request for write access to the block, such as ReadMod command 1402 on the Q0 virtual channel. P2's MAF controller 412 creates a new MAF entry to track the ReadMod command 1402 which is routed to and received by the home memory subsystem 302h. The memory controller 424 accesses directory entry 815a to determine how to respond to P2's ReadMod command 1402. As the directory entry's owner and last writer fields 814, 822 indicate different entities, memory controller 424 concludes that the entity indicated in the owner field 814, processor P3, is the block's owner, and issues a FReadMod command 1404 on the Q1 virtual channel to P3. Memory controller 424 also updates the directory entry to reflect that P2 is now the block's owner and that there are no sharers. Directory entry 815b indicates how entry 815a would appear following the memory controller's processing of the ReadMod command 1402 from P2.

Suppose further that, after granting ownership of the block to P2, processor P4 also designated by reference numeral 404d requests a shared or read access to the memory block, and that two or more other processors also request read access to the memory block. As more than two entities have a shared copy of the block, the sharer field 816 converts to a coarse vector. Assuming the system 300 has sixteen sockets, each bit of the coarse vector may correspond to a socket 200 of the SMP system 300. Suppose also that P4 is located at the same socket as P3, and that, as P4 is a sharer of the block, this bit of the coarse vector is asserted. Directory entry 815c indicates how entry 815b would appear following the memory controller's processing of the requests for shared access to the block, including the representation of the sharer field 816 as a coarse vector. For purposes of clarity, the coarse vector 816 is shown with only 8-bits.

Next, suppose processor P0 also designated by reference numeral 404a issues a request for write access to the memory block, such as a ReadMod command 1406 on the Q0 virtual channel. P0's ReadMod command 1406 is routed to the home memory subsystem 202h which accesses the directory entry, i.e., entry 815c, for the specified memory block. As the contents of the owner and writer fields 814 and 822 specify different entities, the memory controller concludes that the entity identified in the owner field 814, i.e., P2 has the most up-to-date version of the block. Accordingly, the memory controller issues a FReadMod command 1408 (FIG. 14B) to P2 on the Q1 virtual channel directing it to satisfy P0's ReadMod command 1406 out of P2's cache. The memory controller also issues invalidates to those data processing entities that have a shared copy of the memory block. As the sharer field 816 is in the coarse vector mode, however, the memory controller only knows which sockets have one or more cached copies of the memory block, and not which specific processor(s) in those sockets have the cached copies.

In accordance with this aspect of the invention, the memory controller preferably issues Invalidate_If_Clean commands to those sockets having a cached copy of the memory block as indicated by the sharer field 816. The memory controller also updates the directory entry for the memory block to reflect that P0 is now the owner and that there are no sharers. Directory entry 815d illustrates how entry 815c would appear following the ReadMod command 1406 from P0.

Upon receipt within a targeted socket, the Invalidate_If_Clean command is preferably broadcast to each processor within the socket. As P3 and P4 are both in the same socket, each receives a copy of the Invalidate_If_Clean command sent to that socket, as represented by Invalidate_If_Clean commands 1410 and 1412. As the interconnect fabric 306 and virtual channels are not required to maintain order over commands, the Invalidate_If_Clean command 1410 may reach P3 before the FReadMod command 1404. The Invalidate_If_Clean command 1410 does not collide with a pending MAF entry at P3. It does, however, hit on a valid entry of P3's cache that is in the dirty state, as the FReadMod command 1404 has yet to be received at P3. P3 responds to the Invalidate_If_Clean command 1410 that hits on a cache entry by checking whether the cache entry is in the dirty state. If it is, the Invalidate_If_Clean command 1410 is preferably ignored by P3. Because the cache entry at P3 is in the dirty state, P3 ignores the Invalidate_If_Clean command 1410. That is, P3 neither invalidates the cache line nor stores the Inval in the write pointer or write chain state fields of its MAF. It does, however, issue an IAck command to P2.

The Invalidate_If_Clean command 1412 received at P4 also hits on a cache entry at P4. Here, the cache entry is not in the dirty state. Accordingly, P4 responds to the Invalidate_If_Clean command 1412 by invalidating the copy of the memory block from its cache and issuing an IAck command 1414 to P2 confirming that P4 has invalidated its copy of the memory block. When the FReadMod command 1404 reaches P3, the block will still be in the valid and dirty state. P3 thus responds to the FReadMod command 1404 by issuing a FillMod command 1416 on the Q2 virtual channel to P2 that includes a copy of the memory block from P3's cache. P3 also invalidates its cached copy of the memory block. P3 may send a separate IAck command to P2 or the FillMod command may represent confirmation that P3 has invalidated its copy of the memory block. Similarly, when the FReadMod command 1408 reaches P2, it issues its own FillMod command 1418 to P0 on the Q2 virtual channel.

In the absence of the Invalidate_If_Clean command, P3 would respond to a regular Invalidate (that targets a dirty block) by returning the dirty block to its home memory subsystem 302h, assuming P3 is a non-dirty shared processor. The FReadMod command 1404 would then miss at P3's cache causing a race condition. Utilization of the Invalidate_If_Clean command avoids such race conditions.

It should be understood that although the present invention is designed to eliminate the need for markers and ordered channels that the present could nonetheless be utilized in computer systems that have markers and ordered channels.

It should be further understood that the directories may not include a sharer field at all. In this case, the memory controllers preferably broadcast invalidates to all data processing entities within the system 300 in response to requests for write or exclusive access to memory blocks.

The foregoing description has been directed to specific embodiments of the present invention. It will be apparent, however, that other variations and modifications may be made to the described embodiments, with the attainment of some or all of their advantages. For example, the SMP system could employ a plurality of physically independent channels, each having its own components, such as control logic, buffers, etc., instead of virtual channels that share such components. Furthermore, the invention could be used with a single processor computer system. Therefore, it is the object of the appended claims to cover all such variations and modifications as come within the true spirit and scope of the invention.

What is claimed is:

1. A method for resolving ambiguous invalidates in a computer system having a plurality of data processing entities, a shared memory organized into a plurality of memory blocks, and one or more coherency units for maintaining status information over the memory blocks, at least some of the data processing entities having one or more caches and configured to issue requests for selected memory blocks, the method comprising:
   deleting a clean version of a given memory block from the cache of a first data processing entity, and providing no notification to the one or more coherency units of the deletion;
   issuing from the first data processing entity a request for read access to the given memory block;
   receiving at the first data processing entity an invalidate targeting the given memory block prior to receipt of the given memory block;
   storing the invalidate at the first data processing entity; and
   replaying the invalidate upon receipt of the memory block at the first data processing entity.

2. The method of claim 1 further comprising:
   storing the received memory block in the first data processing entity's cache; and
   assigning a valid state to the memory block stored in the cache.

3. The method of claim 2 wherein the invalidate identifies a second data processing entity and the step of replaying comprises:
   transitioning the memory block stored in the first processing entity's cache to an invalid state; and
   issuing an Invalidate_Acknowledgement (lAck) to the second data processing entity.

4. The method of claim 3 wherein the computer system implements a relaxed consistency model that defines consistency markers whereby the data processing entities read and write memory blocks independent of having received all consistency markers for the memory blocks.

5. The method of claim 4 wherein
   the consistency markers are implemented through the IAcks, and
   the data processing entities read and write memory blocks, even though one or more IAcks remain outstanding for the memory blocks.

6. The method of claim 4 wherein the data processing entities include one of processors and input/output (I/O) subsystems.

7. The method of claim 4 wherein
   the first data processing entity includes a miss address file (MAF) for tracking outstanding requests from the first data processing entity to the shared memory, and the invalidate is stored at the MAF.

8. The method of claim 1 wherein the one or more coherency units identify sharing entities through one or more coarse vectors.

9. The method of claim 1 wherein the one or more coherency units are free from recording sharers of memory blocks, and the method further comprises the step of broadcasting invalidates to all data processing entities.

10. The method of claim 1 wherein the one or more coherency units are free from issuing markers to the data processing entities in response to accessing the one or more coherency units.

11. The method of claim 10 further comprising providing an interconnect fabric within the computer system, the interconnect fabric providing a communication link among the data processing entities and the shared memory, the interconnect fabric supporting a plurality of channels, the channels configured to carry requests, probes and responses out of order.

12. A method for resolving ambiguous invalidates in a computer system having a plurality of data processing entities, a shared memory organized into a plurality of memory blocks, and one or more coherency units for maintaining status information over the memory blocks, at least some of the data processing entities having one or more caches and configured to issue requests for selected memory blocks, the method comprising:

deleting a clean version of a given memory block from the cache of a first data processing entity, and providing no notification to the one or more coherency units of the deletion;

issuing from the first data processing entity a request for the given memory block;

receiving at the first data processing entity an invalidate targeting the given memory block prior to receipt of the given memory block, the invalidate identifying a second data processing entity;

issuing an Invalidate_Acknowledgement (lAck) from the first data processing entity, prior to receiving the given memory block, to the second data processing entity;

storing the invalidate at the first data processing entity; and replaying the invalidate upon receipt of the given memory block at the first data processing entity.

13. The method of claim 12 wherein the replaying comprises the step of storing the given memory block at the first data processing entity's cache and assigning an invalid state to the given memory block as stored in the cache, and the storing of the given memory block in the cache and the assigning of the block to the invalid state are performed as part of a single, atomic operation.

14. The method of claim 13 wherein one or more data processing entities are configured to withhold issuance of a memory block buffered at the one or more data processing entities in response to receiving a snoop message until the one or more data processing entities have received all outstanding IAcks for the memory block that is the subject of the snoop message.

\* \* \* \* \*

UNITED STATES PATENT AND TRADEMARK OFFICE
CERTIFICATE OF CORRECTION

| | | |
|---|---|---|
| PATENT NO. | : 6,990,559 B2 | Page 1 of 1 |
| APPLICATION NO. | : 10/263835 | |
| DATED | : January 24, 2006 | |
| INVENTOR(S) | : Stephen R. Van Doren et al. | |

It is certified that error appears in the above-identified patent and that said Letters Patent is hereby corrected as shown below:

In column 6, line 2, after "command" delete "mand".

In column 30, line 36, in Claim 3, delete "(lAck)" and insert -- (IAck) --, therefor.

In column 32, line 1, in Claim 12, delete "(lAck)" and insert -- (IAck) --, therefor.

Signed and Sealed this

Nineteenth Day of May, 2009

JOHN DOLL
*Acting Director of the United States Patent and Trademark Office*